(12) United States Patent
Yasumura

(10) Patent No.: US 7,193,868 B2
(45) Date of Patent: Mar. 20, 2007

(54) SWITCHING POWER SUPPLY CIRCUIT

(75) Inventor: Masayuki Yasumura, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 11/368,732

(22) Filed: Mar. 6, 2006

(65) Prior Publication Data
US 2006/0209576 A1 Sep. 21, 2006

(30) Foreign Application Priority Data
Mar. 8, 2005 (JP) ............... 2005-064482

(51) Int. Cl.
H02M 3/335 (2006.01)
H02M 3/315 (2006.01)

(52) U.S. Cl. .............. 363/25; 363/26; 363/133; 363/134

(58) Field of Classification Search ............. 363/24, 363/25, 26, 56.06, 56.08, 133, 134
See application file for complete search history.

(56) References Cited

U.S. PATENT DOCUMENTS

| 5,761,055 | A | * | 6/1998 | Okada et al. ............. 363/56.08 |
| 5,805,432 | A | * | 9/1998 | Zaitsu et al. ................ 363/16 |
| 6,483,721 | B2 | | 11/2002 | Terashi et al. |
| 6,654,259 | B2 | | 11/2003 | Koshita et al. |
| 6,680,854 | B2 | * | 1/2004 | Morita et al. ................ 363/25 |
| 6,934,167 | B2 | | 8/2005 | Jang et al. |
| 7,095,629 | B2 | * | 8/2006 | Yasumura ................... 363/16 |

FOREIGN PATENT DOCUMENTS

| JP | 06-327246 A | 11/1994 |
| JP | 2000-134925 A | 5/2000 |
| JP | 2000-152617 | 5/2000 |
| JP | 2003-235259 A | 8/2003 |
| JP | 2004-194105 A | 7/2004 |

* cited by examiner

Primary Examiner—Bao Q. Vu
(74) Attorney, Agent, or Firm—Lerner, David, Littenberg, Krumholz & Mentlik, LLP

(57) ABSTRACT

A wide-range compatible voltage resonant converter provides high efficiency and allows use of low-breakdown-voltage products for a circuit. The voltage resonant converter is provided with a secondary-side parallel resonant circuit and a secondary-side series resonant circuit, and a loose coupling state is established in which the coupling coefficient of an isolation converter transformer is about 0.7 or less. Thus, a constant-voltage control characteristic is obtained as a sharp unimodal characteristic, which narrows the switching frequency control region required for stabilization of an output voltage. In addition, a primary-side parallel resonant frequency, a secondary-side parallel resonant frequency and a secondary-side series resonant frequency are set so that a favorable power conversion efficiency is obtained. Moreover, an active clamp circuit is provided to suppress the peak level of a resonant voltage pulse to thereby allow use of low-breakdown-voltage products for a switching element and so on.

14 Claims, 10 Drawing Sheets

FIG.10A
FIG.10B
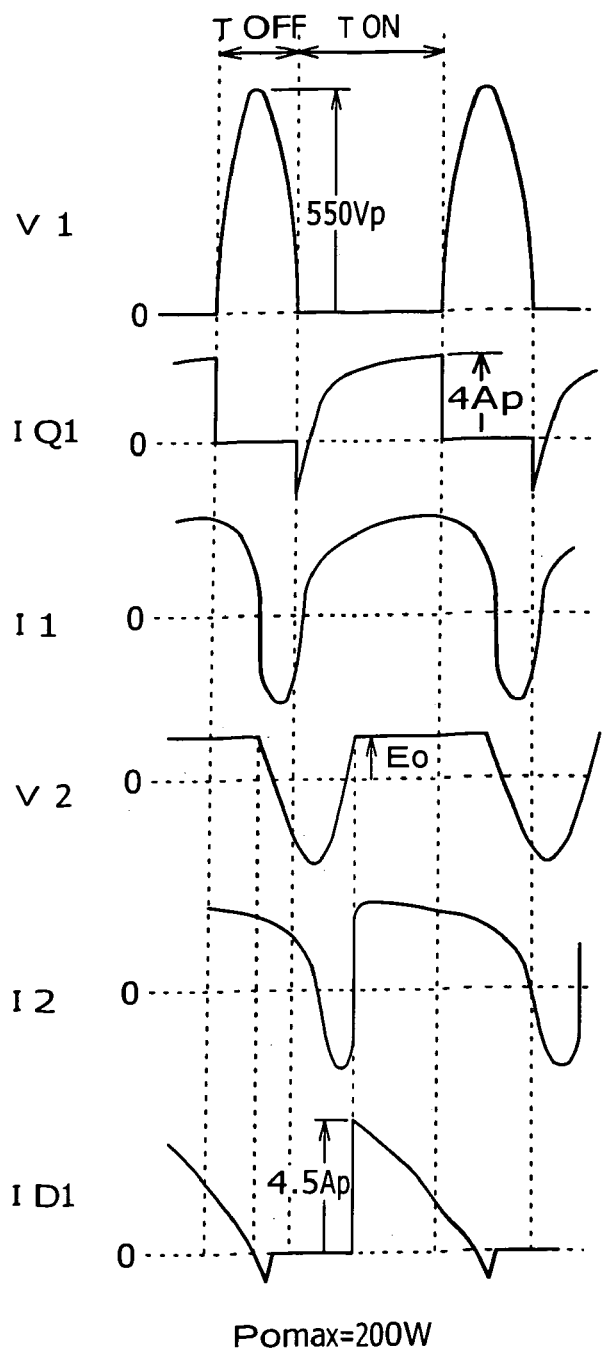
Pomax=200W
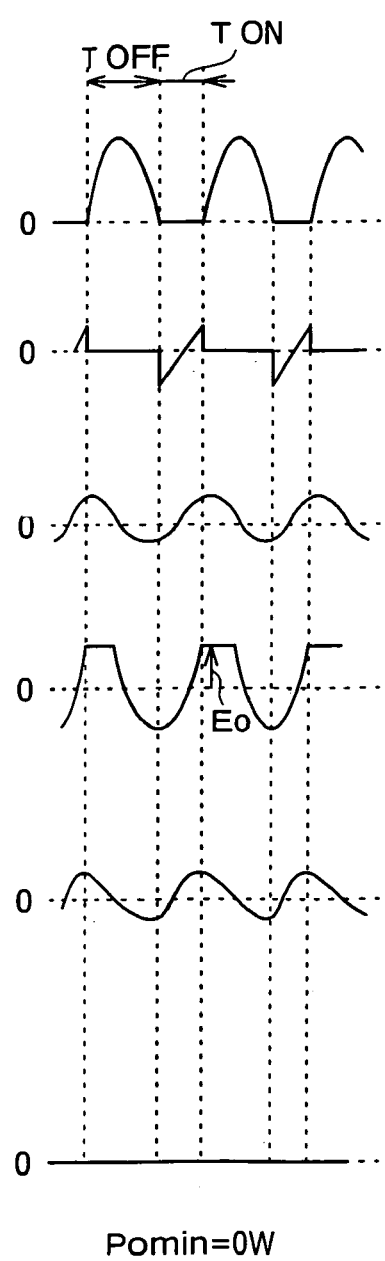
Pomin=0W

US 7,193,868 B2

SWITCHING POWER SUPPLY CIRCUIT

CROSS-REFERENCE TO RELATED APPLICATIONS

The present application claims priority from Japanese Patent Application No. JP 2005-064482 filed on Mar. 8, 2005, the disclosure of which is hereby incorporated by reference herein.

BACKGROUND OF THE INVENTION

The present invention relates to a switching power supply circuit including a voltage resonant converter.

As types of a so-called soft switching power supply that employs a resonant converter, a current resonant type and a voltage resonant type have been widely known. Currently, half-bridge connected current resonant converters formed of a two-transistor switching element have been widely employed since they can easily be put into practical use.

However, since characteristics of high-breakdown-voltage switching elements are currently being improved for example, problems about breakdown voltage associated with putting voltage resonant converters into practical use are being cleared up. Furthermore, it is known that a single-ended voltage resonant converter formed of one-transistor switching element is advantageous over a one-transistor current resonant forward converter with regard to input feedback noises and noise components of a DC output voltage line.

FIG. 9 illustrates one configuration example of a switching power supply circuit including a single-ended voltage resonant converter.

In the switching power supply circuit of FIG. 9, a voltage from a commercial alternating-current power supply AC is rectified and smoothed by a rectifying and smoothing circuit formed of a bridge rectifier circuit Di and a smoothing capacitor Ci, to thereby produce a rectified and smoothed voltage Ei as the voltage across the smoothing capacitor Ci.

The lines from the commercial power supply AC are provided with a noise filter that includes a pair of common mode choke coils CMC and two across-line capacitors CL, and removes common mode noises.

The rectified and smoothed voltage Ei is input to the voltage resonant converter as a DC input voltage. The voltage resonant converter has a single-ended configuration including one-transistor switching element Q1 as described above. The voltage resonant converter in this circuit is separately excited. Specifically, the switching element Q1 formed of a MOS-FET is switch-driven by an oscillation and drive circuit 2.

A body diode DD of the MOS-FET is connected in parallel to the switching element Q1. In addition, a primary-side parallel resonant capacitor Cr is connected in parallel to the channel between the source and drain of the switching element Q1.

The primary-side parallel resonant capacitor Cr and the leakage inductance L1 of a primary winding N1 in an isolation converter transformer PIT form a primary-side parallel resonant circuit (voltage resonant circuit). This primary-side parallel resonant circuit offers voltage resonant operation as the switching operation of the switching element Q1.

In order to switch-drive the switching element Q1, the oscillation and drive circuit 2 applies a gate voltage as a drive signal to the gate of the switching element Q1. Thus, the switching element Q1 implements switching operation with the switching frequency dependent upon the cycle of the drive signal.

The isolation converter transformer PIT transmits switching outputs from the switching element Q1 to the secondary side.

The isolation converter transformer PIT is constructed of an EE-core that is formed by combining E-cores composed of a ferrite material for example. Furthermore, the primary winding N1 and a secondary winding N2 are wound around the center magnetic leg of the EE-core, with the winding part being divided into the primary side and secondary side.

In addition, a gap with a length of about 1.0 mm is provided in the center magnetic leg of the EE-core in the isolation converter transformer PIT, so that a coupling coefficient k of about 0.80 to 0.85 is obtained between the primary side and the secondary side. When the coupling coefficient k has such a value, the coupling degree between the primary and secondary sides may be regarded as loose coupling, and thus it is difficult to obtain the saturation state. The value of the coupling coefficient k is a factor in setting the leakage inductance (L1).

One end of the primary winding N1 in the isolation converter transformer PIT is interposed between the switching element Q1 and the positive electrode of the smoothing capacitor Ci. Thus, the transmission of switching outputs from the switching element Q1 is allowed. In the secondary winding N2 of the isolation converter transformer PIT, an alternating voltage induced by the primary winding N1 is generated.

In this circuit, a secondary-side parallel resonant capacitor C2 is connected in parallel to the secondary winding N2. Thus, the leakage inductance L2 of the secondary winding N2 and the capacitance of the secondary-side parallel resonant capacitor C2 form a secondary-side parallel resonant circuit (voltage resonant circuit).

Furthermore, as shown in FIG. 9, connected to this secondary-side parallel resonant circuit are a rectifier diode Do1 and a smoothing capacitor Co, to thereby form a half-wave rectifier circuit. This half-wave rectifier circuit produces, as the voltage across the smoothing capacitor Co, a secondary-side DC output voltage Eo with the same level as that of an alternating voltage V2 induced in the secondary winding N2 (secondary-side parallel resonant circuit). The secondary-side DC output voltage Eo is supplied to a load, and is input to a control circuit 1 as a detected voltage for constant-voltage control.

The control circuit 1 detects the level of the secondary-side DC output voltage Eo input as a detected voltage, and then inputs the obtained detection output to the oscillation and drive circuit 2.

According to the level of the secondary-side DC output voltage Eo indicated by the input detection output, the oscillation and drive circuit 2 controls the switching operation of the switching element Q1 so that the secondary-side DC output voltage Eo is kept constant at a certain level. That is, the oscillation and drive circuit 2 produces and outputs a drive signal for achieving intended switching operation. Thus, stabilization control of the secondary-side DC output voltage Eo is achieved.

FIGS. 10A, 10B and 11 show results of experiments on the power supply circuit in FIG. 9. In the experiments, major parts of the power supply circuit of FIG. 9 were designed to have the following characteristics, as conditions for an AC input voltage VAC of 100 V, which corresponds to an AC 100 V-system input.

As the switching element Q1, a product of which breakdown voltage was 900 V was selected. As the secondary-side rectifier diode Do1, a product of which breakdown voltage was 600 V was selected.

The core of the isolation converter transformer PIT employed an EER-35 core, and a gap in the center magnetic leg thereof was designed to have a gap length of 1 mm. The numbers of turns T of the primary winding N1 and the secondary winding N2 were both set to 43 T. The coupling coefficient k of the isolation converter transformer PIT was set to 0.81.

The capacitances of the primary-side parallel resonant capacitor Cr and the secondary-side parallel resonant capacitor C2 were set to 6800 pF and 0.01 µF, respectively. Accordingly, the resonant frequency fo1 of the primary-side parallel resonant circuit was set to 175 kHz, and the resonant frequency fo2 of the secondary-side parallel resonant circuit was set to 164 kHz.

The rated level of the secondary-side DC output voltage Eo was 135 V. The allowable load power range was from the maximum load power Pomax of 200 W to the minimum load power Pomin of 0 W.

FIGS. 10A and 10B are waveform diagrams showing the operation of major parts in the power supply circuit in FIG. 9, while reflecting the switching cycle of the switching element Q1. FIG. 10A shows a switching voltage V1, a switching current IQ1, a primary winding current I1, a secondary winding voltage V2, a secondary winding current I2, and a secondary-side rectified current ID1, when the load power is the maximum load power Pomax of 200 W. FIG. 10B shows the switching voltage V1, the switching current IQ1, the primary winding current I1, the secondary winding voltage V2, the secondary winding current I2, and the secondary-side rectified current ID1, when the load power is the minimum load power Pomin of 0 W.

The switching voltage V1 is the voltage obtained across the switching element Q1. The switching voltage V1 has a waveform like those in FIGS. 10A and 10B. Specifically, the voltage level is at 0 level during the period TON when the switching element Q1 is in the on-state, while a sinusoidal voltage resonant pulse is obtained during the period TOFF when it is in the off-state. This voltage resonant pulse waveform of the switching voltage V1 indicates that the operation of the primary-side switching converter is voltage resonant operation.

The peak level of the voltage resonant pulse of the switching voltage V1 was 550 Vp when the load power was the maximum load power Pomax of 200 W and the input voltage VAC was 100 V (AC 100 V-system), and was 800 Vp when the load power was the maximum load power Pomax of 200 W and the input voltage VAC was 264 V (AC 200 V-system). In order to respond to these peak levels of the voltage resonant pulse, a product of which breakdown voltage was 900 V was used as the switching element Q1 as described above.

The switching current IQ1 is the current flowing through the switching element Q1 (and the body diode DD). During the period TOFF, the switching current IQ1 is at 0 level. During the period TON, the switching current IQ1 with a certain waveform like illustrated one is obtained. Specifically, at the time of turn on of the switching element Q1, the switching current IQ1 flows through the body diode DD in the forward direction thereof, and thus the switching current IQ1 has the negative polarity. After the turn on, the polarity is inverted and the switching current IQ1 flows between the drain and source of the switching element Q1. The current value increases with time until turn off of the switching element Q1. Therefore, the peak level of the switching current IQ1 is obtained at the timing of the turn off.

The primary winding current I1 flowing through the primary winding N1 is the current resulting from the synthesis between the current flowing as the switching current IQ1 during the period TON and the current flowing to the primary-side parallel resonant capacitor Cr during the period TOFF. Thus, the primary winding current I1 has a waveform like those shown in FIGS. 10A and 10B.

As the operation of the secondary-side rectifier circuit, the rectified current ID1 flows through the rectifier diode Do1 with having a certain waveform like that shown in FIG. 10A when the load power is the maximum load power of 200 W. Specifically, the peak level of the rectified current ID1 is obtained at the time of turn on of the rectifier diode Do1, and then the level gradually decreases toward 0 as shown in the waveform of FIG. 10A. During the period when the rectifier diode Do1 is in the off-state, the level of the rectifier diode Do1 is at 0. In contrast, when the load power is the minimum load power Pomin of 0 W, the current level is invariably at 0 even during the ON period of the rectifier diode Do1.

The secondary winding voltage V2 is obtained in the parallel circuit of the secondary winding N2 and the secondary-side parallel resonant capacitor C2. During the period when the secondary-side rectifier diode Do1 conducts, the secondary winding voltage V2 is clamped at the level of the secondary-side DC output voltage Eo. During the OFF period of the secondary-side rectifier diode Do1, the secondary winding voltage V2 shows a sinusoidal waveform of the negative polarity. The secondary winding current I2 flowing through the secondary winding N2 is the current resulting from the synthesis between the rectified current ID1 and the current flowing through the secondary-side parallel resonant circuit (N2 (L2)//C2). The secondary winding current I2 has the illustrated waveform for example.

FIG. 11 shows, as a function of load, the switching frequency fs, the ON period TON, the OFF period TOFF, and the AC to DC power conversion efficiency (ηAC→DC) of the power supply circuit shown in FIG. 9.

As for the AC to DC power conversion efficiency (ηAC→DC), an efficiency of 90% or more is achieved when the load power Po is in the range of 100 W to 200 W. It is known that a particularly single-ended voltage resonant converter, of which switching element Q1 is formed of one transistor, offers favorable power conversion efficiencies.

In addition, the switching frequency fs, the ON period TON, and the OFF period TOFF in FIG. 11 indicate the switching operation of the power supply circuit of FIG. 9 as the characteristic of constant-voltage control against load variation. In the circuit, the switching frequency fs is controlled so that the switching frequency increases as the load becomes lighter. As for the ON and OFF periods TON and TOFF, the period TOFF is almost constant independently of load variation. In contrast, the period TON is shortened as the load becomes lighter. That is, the power supply circuit in FIG. 9 varies and controls the switching frequency so as to shorten the ON period TON as the load becomes lighter while keeping the OFF period TOFF constant.

This variation control of the switching frequency allows variation of the inductive impedance that is due to the existence of the primary-side parallel resonant circuit and secondary-side parallel resonant circuit. This inductive impedance variation leads to a change of the amount of transmitted power from the primary side to the secondary side, and a change of the amount of transmitted power from the secondary-side parallel resonant circuit to a load. As a result, the level of the secondary-side DC output voltage Eo is varied. Thus, the secondary-side DC output voltage Eo is stabilized.

FIG. 12 schematically shows the constant-voltage control characteristic of the power supply circuit shown in FIG. 9, based on the relationship between the switching frequency fs (kHz) and the secondary-side DC output voltage Eo.

When the resonant frequencies of the primary-side and secondary-side parallel resonant circuits are defined as fo1 and fo2, respectively, the secondary-side parallel resonant frequency fo2 is lower than the primary-side parallel resonant frequency fo1 in the circuit of FIG. 9 as described above.

The characteristic curves in FIG. 12 are based on these resonant frequencies, and based on an assumption of constant-voltage control characteristics relating to the switching frequency fs, obtained for a certain constant AC input voltage VAC. Specifically, Characteristic curves A and B indicate the constant-voltage control characteristics obtained when the load power is the maximum load power Pomax and the minimum load power Pomin, respectively, based on the resonant impedance corresponding to the resonant frequency fo1 of the primary-side parallel resonant circuit. Characteristic curves C and D indicate the constant-voltage control characteristics obtained when the load power is the maximum load power Pomax and the minimum load power Pomin, respectively, based on the resonant impedance corresponding to the resonant frequency fo2 of the secondary-side parallel resonant circuit.

When a circuit includes a primary-side parallel resonant circuit and a secondary-side parallel resonant circuit like the circuit in FIG. 9, the center resonant frequency fo exists between the resonant frequencies fo1 and fo2. Characteristic curves E and F indicate the resonant impedance characteristics, based on the relationship between the center resonant frequency fo and the switching frequency fs, obtained when the load power is the maximum load power Pomax and the minimum load power Pomin, respectively.

In a voltage resonant converter including a secondary-side parallel resonant circuit, the level of the secondary-side DC output voltage Eo is determined depending on the resonant impedance characteristic with respect to the center resonant frequency fo, as a function of the switching frequency fs. Furthermore, the voltage resonant converter in FIG. 9 employs a lower-side control method, in which the switching frequency fs is varied and controlled in a frequency range lower than the center resonant frequency fo.

When, under the characteristics corresponding to the center resonant frequency fo, indicated by Characteristic curves E and F in FIG. 12, constant-voltage control in which the target value of the output voltage is the rated level of the secondary-side DC output voltage Eo (135 V, in the circuit of FIG. 9) is intended with use of switching frequency control based on lower-side control, the variable range of the switching frequency fs required for the constant-voltage control (requisite control range) is the range indicated by Δfs. That is, in the frequency range indicated by Δfs, the switching frequency is varied to a requisite value according to load variation. Thus, the secondary-side DC output voltage Eo is controlled so that it is kept at a rated level tg.

An example of the conventional power supply circuits is disclosed in Japanese Patent Laid-open No. 2000-152617.

In step with diversification of various electronic apparatuses, demands have been increasing for so-called wide-range compatible power supply circuits that operate in response both to commercial AC voltage inputs of the AC 100-V system and AC 200-V system.

The power supply circuit in FIG. 9 operates so as to stabilize the secondary-side DC output voltage Eo by switching frequency control as described above. The variable range (requisite control range) of the switching frequency required for the voltage stabilization is indicated by Δfs described in FIG. 12.

The power supply circuit of FIG. 9 is designed to respond to load variation of a comparatively wide variation range from 200 W to 0 W. In the power supply circuit of FIG. 9, an actual requisite control range of the switching frequency fs for this load variation condition is from 117.6 kHz to 208.3 kHz. That is, the range Δfs is 96.7 kHz, and this range is comparatively wide.

It is obvious that when the level of the AC input voltage VAC is changed, the level of the secondary-side DC output voltage Eo also varies. That is, the level of the secondary-side DC output voltage Eo varies depending on the level of the AC input voltage VAC.

Therefore, the level variation of the secondary-side DC output voltage Eo is larger when the AC input voltage varies in a wide range including both the AC 100-V system and AC 200-V system, compared with the level variation when the AC input voltage varies only in a single range of the AC 100-V system or AC 200-V system for example. In order to ensure constant-voltage control operation compatibly with the wide level variation of the secondary-side DC output voltage Eo, the requisite control range of the switching frequency needs to be widened from the above-described range of 117.6 kHz to 208.3 kHz so that higher frequencies are also covered.

However, in a present IC (the oscillation and drive circuit 2) for driving switching elements, the upper limit of a possible drive frequency is about 200 kHz. Even if an IC is developed so that an IC can drive switching elements with such a high frequency, the driving of switching elements with a high frequency leads to a significant decrease of the power conversion efficiency. It therefore is substantially impossible to put this IC into practical use for a power supply circuit.

As described above, it is very difficult to achieve a wide-range compatible power supply circuit by use of the configuration shown in FIG. 9 for example.

The power supply circuit shown in FIG. 9 includes a single-ended voltage resonant converter on its primary side. The power supply circuit with such a configuration tends to offer advantages for achieving a high power conversion efficiency as described above. However, in consideration of recent energy circumstances and environmental circumstances for example, electronic apparatuses have been required to have a further higher power conversion efficiency characteristic. Accordingly, a power supply circuit itself incorporated in an electronic apparatus has been required to have a further improved power conversion efficiency.

SUMMARY OF THE INVENTION

In consideration of the above-described problems, one embodiment of the present invention provides a switching power supply circuit having the following configuration.

Specifically, the switching power supply circuit includes a switching unit including a main switching element supplied with a direct-current (DC) input voltage and operable to perform a switching operation, and a switching drive unit that drives the main switching element to perform the switching operation.

The circuit also includes an isolation converter transformer having a primary winding on a primary side and a secondary winding on a secondary side. The primary winding is supplied with a switching output obtained by the switching operation of the switching unit. The secondary winding has an alternating voltage induced therein by the primary winding.

In addition, the circuit also includes a primary-side parallel resonant circuit including a leakage inductance component of the primary winding and a capacitance of a primary-side parallel resonant capacitor. The primary-side parallel resonant circuit converts operation of the switching unit into a voltage resonant operation.

The circuit further includes a secondary-side parallel resonant circuit formed by a secondary-side parallel resonant capacitor connected in parallel with the secondary winding, the secondary-side parallel resonant circuit including a leakage inductance component of the secondary winding and a capacitance of the secondary-side parallel resonant capacitor.

Furthermore, the circuit also includes a secondary-side series resonant circuit formed by a secondary-side series resonant capacitor connected in series with the secondary winding, the secondary-side series resonant circuit including a leakage inductance component of the secondary winding and a capacitance of the secondary-side series resonant capacitor.

The circuit also includes a secondary-side rectifying and smoothing unit supplied with the alternating voltage induced in the secondary winding, and performing a rectifying operation on the alternating voltage to produce a secondary-side DC output voltage, and a constant-voltage control unit that performs constant-voltage control of the secondary-side DC output voltage by controlling the switching drive unit according to a level of the secondary-side DC output voltage to adjust the switching frequency of the switching unit.

Moreover, the circuit may further include an active clamp circuit including an auxiliary switching element, the active clamp circuit setting an ON period within a period during which the main switching element is in the off-state. The auxiliary switching element is in the on-state in the ON period. The active clamp circuit causes charging and discharging currents to flow through the auxiliary switching element during the ON period. The charging and discharging currents flow to the primary-side parallel resonant capacitor in the absence of the active clamp circuit.

In the circuit, the coupling coefficient between the primary side and the secondary side of the isolation converter transformer is set so as to obtain loose coupling therebetween so that an electromagnetically coupled resonant circuit formed by at least the primary-side parallel resonant circuit and the secondary-side parallel resonant circuit has a unimodal output characteristic with respect to the input of a frequency signal having the switching frequency. In addition, the resonant frequency of the primary-side parallel resonant circuit, the resonant frequency of the secondary-side parallel resonant circuit and the resonant frequency of the secondary-side series resonant circuit are set so as to obtain a power conversion efficiency above a predetermined level under predetermined load conditions.

The power supply circuit according to the embodiment has a basic configuration in which a voltage resonant converter is provided on the primary side and a secondary-side parallel resonant circuit and a secondary-side series resonant circuit are provided on the secondary side. This configuration can be regarded as a configuration including a parallel resonant circuit on each of the primary and secondary sides.

From this viewpoint, the configuration has a coupled resonant circuit due to electromagnetic coupling by the isolation converter transformer. In addition, the isolation converter transformer is designed so as to obtain loose coupling based on a certain coupling coefficient. Thus, a sharp unimodal output characteristic can be obtained with respect to a frequency signal (switching output) having a switching frequency, which is an input to the coupled resonant circuit. As a result, the switching frequency variable range (requisite control range) required for stabilizing a secondary-side DC output voltage can be narrowed.

Moreover, the power supply circuit according to the embodiment can be regarded also as a voltage resonant converter that is provided with a series resonant circuit on the secondary side. Typically, a voltage resonant converter having a series resonant circuit on the secondary side has a favorable power conversion efficiency characteristic, but tends to cause abnormal operation in which zero volt switching (ZVS) operation fails to be performed, when the load is an intermediate load. In order to address this problem, the embodiment designs the isolation converter transformer to obtain a loose coupling state above a certain extent, to thereby allow suppression and elimination of the abnormal operation. Therefore, ZVS operation can be maintained in the entire allowable load power region.

Furthermore, an active clamp circuit is provided to thereby cause charging and discharging currents that originally should flow to a primary-side parallel resonant capacitor to flow through an auxiliary switching element. This operation of the active clamp circuit suppresses the peak level of a resonant voltage pulse that is the voltage across the primary-side parallel resonant capacitor.

As described above, the present invention narrows the variable control range (requisite control range) of the switching frequency of a voltage resonant converter, required for constant-voltage control. Thus, regarding a voltage resonant switching converter, a wide-range compatible configuration can easily be achieved simply by implementing switching frequency control.

In order to achieve such a wide-range compatible configuration, it is enough to form a basic configuration in which the isolation converter transformer of the voltage resonant converter having a secondary-side resonant circuit is designed to offer a requisite coupling coefficient. Therefore, a wide-range compatible configuration can be achieved without involving increases in costs, circuit size, circuit weight and so on due to an increase of the number of parts.

In addition, since the power supply circuit is formed of a combination between a voltage resonant converter and a secondary-side series resonant circuit, ZVS operation is maintained in the entire allowable load power range, which provides a favorable power conversion efficiency characteristic suitable for practical use of the power supply circuit.

Moreover, since the peak level of a resonant voltage pulse is suppressed by an active clamp circuit, low-breakdown-voltage products can be selected as parts elements typified by a main switching element. Thus, the performance of the parts elements can be improved, which allows enhancement of reliability of a power supply circuit, a cost decrease, and reduction of size and weight of the circuit.

BRIEF DESCRIPTION OF THE DRAWINGS

FIGS. 10A and 10B are waveform diagrams showing the operation of major parts in the power supply circuit shown in FIG. 9;

DETAILED DESCRIPTION

Figure 1:
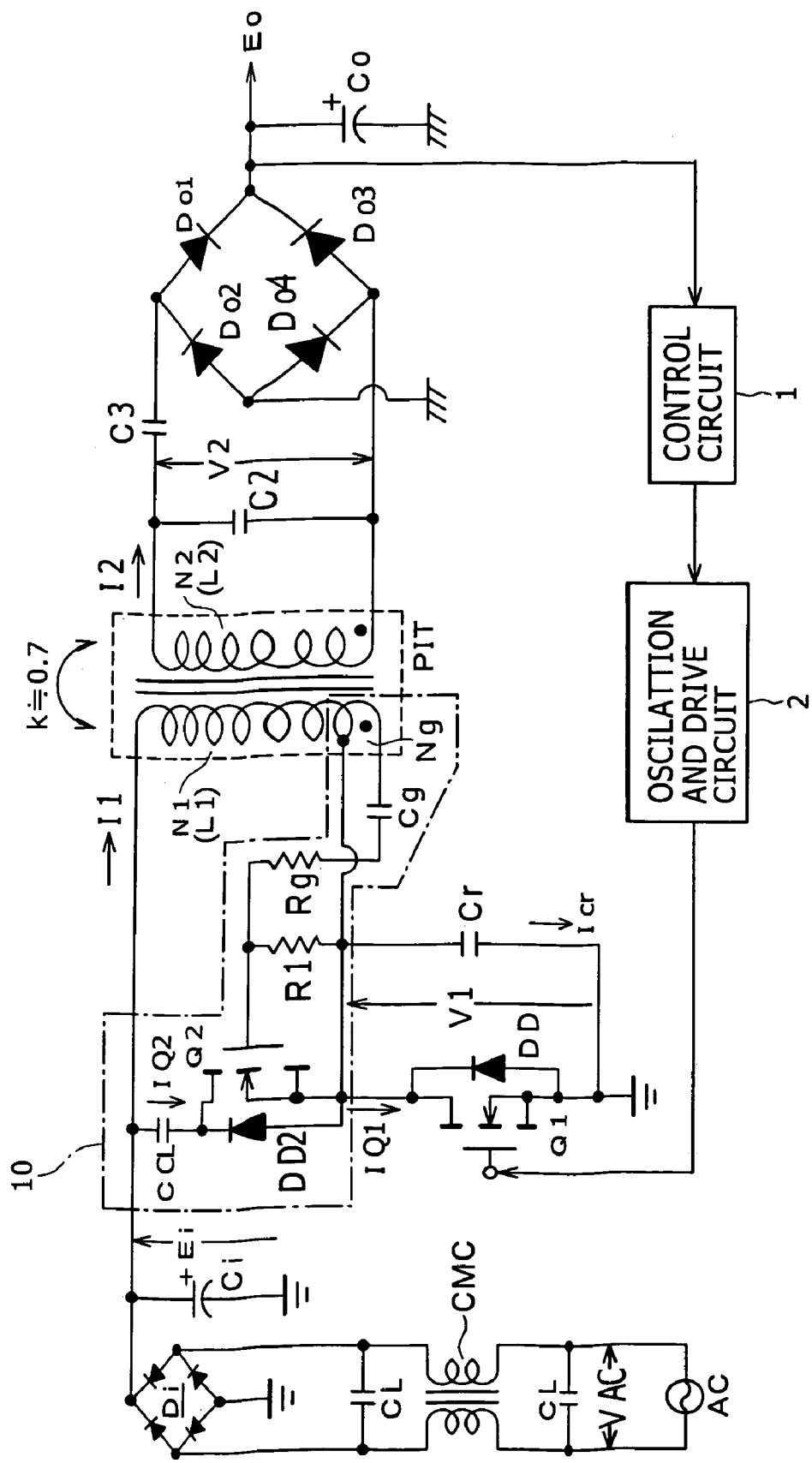
FIG. 1 is a circuit diagram illustrating a configuration example of a power supply circuit according to a first embodiment of the present invention.

FIG. 1 is a circuit diagram illustrating a configuration example of a power supply circuit according to a first embodiment of the present invention, as one of best modes (embodiments) for carrying out the invention. The power supply circuit in FIG. 1 includes, as its basic configuration, a single-ended voltage resonant switching converter.

In the switching power supply circuit in FIG. 1, the lines from a commercial alternating-current power supply AC are provided with a pair of common mode choke coils CMC and two across-line capacitors CL. These common mode choke coils CMC and the across-line capacitors CL form a noise filter that removes common mode noises included in the lines from the commercial alternating-current power supply AC.

A voltage from the commercial alternating-current power supply AC (an AC input voltage VAC) is rectified by a bridge rectifier circuit Di, and the rectified output is charged in the smoothing capacitor Ci. Thus, a rectified and smoothed voltage Ei is obtained as the voltage across the smoothing capacitor Ci. The rectified and smoothed voltage Ei serves as a DC input voltage for the switching converter at the subsequent stage.

In FIG. 1, the switching converter that receives the rectified and smoothed voltage Ei as a DC input voltage and implements switching operation is formed as a single-ended voltage resonant converter that includes, for example, one-transistor switching element Q1. In this circuit, a high-breakdown-voltage MOS-FET is selected as the switching element Q1. The voltage resonant converter in this circuit is separately excited. Specifically, an oscillation and drive circuit 2 switch-drives the switching element.

Applied to the gate of the switching element Q1 is a switching drive signal (voltage) output from the oscillation and drive circuit 2.

The drain of the switching element Q1 is coupled to the winding-start end of a primary winding N1 in an isolation converter transformer PIT to be described later. The winding-finish end of the primary winding N1 is coupled to the positive electrode of the smoothing capacitor Ci. Therefore, the DC input voltage (Ei) is supplied via the serially connected primary winding N1 to the switching element Q1. The source of the switching element Q1 is coupled to the primary-side ground.

Since a MOS-FET is used as the switching element Q1, the switching element Q1 incorporates a body diode DD so that the body diode DD is connected in parallel to the channel between the source and drain of the switching element Q1. The anode of the body diode DD is connected to the source of the switching element Q1, and the cathode thereof is connected to the drain of the switching element Q1. The body diode DD forms the path of a switching current in the reverse direction, arising due to the ON/OFF operation (switching operation) of the switching element Q1.

In addition, a primary-side parallel resonant capacitor Cr is connected in parallel to the channel between the drain and source of the switching element Q1.

The capacitance of the primary-side parallel resonant capacitor Cr and the leakage inductance L1 of the primary winding N1 in the isolation converter transformer PIT form a primary-side parallel resonant circuit (voltage resonant circuit) for a switching current flowing through the switching element Q1. The resonant operation of this primary-side parallel resonant circuit offers voltage resonant operation as the switching operation of the switching element Q1. In response to this operation, during the OFF period of the switching element Q1, a sinusoidal voltage resonant pulse is obtained as a switching voltage V1, which is the voltage across the switching element Q1 (voltage between the drain and source).

In order to drive the switching element Q1 by separate excitation for example, the oscillation and drive circuit 2 includes an oscillation circuit that generates an oscillation signal. Based on the oscillation signal, the oscillation and drive circuit 2 produces a drive signal that is a gate voltage for switch-driving the MOS-FET, and applies it to the gate of the switching element Q1. Thus, the switching element Q1 continuously implements ON/OFF operation with the switching frequency dependent upon the cycle of the drive signal. That is, the switching element Q1 implements switching operation.

The isolation converter transformer PIT transmits switching outputs from the primary-side switching converter to the secondary side, while isolating the primary side from the secondary side in terms of DC voltage transmission therebetween.

Figure 2:
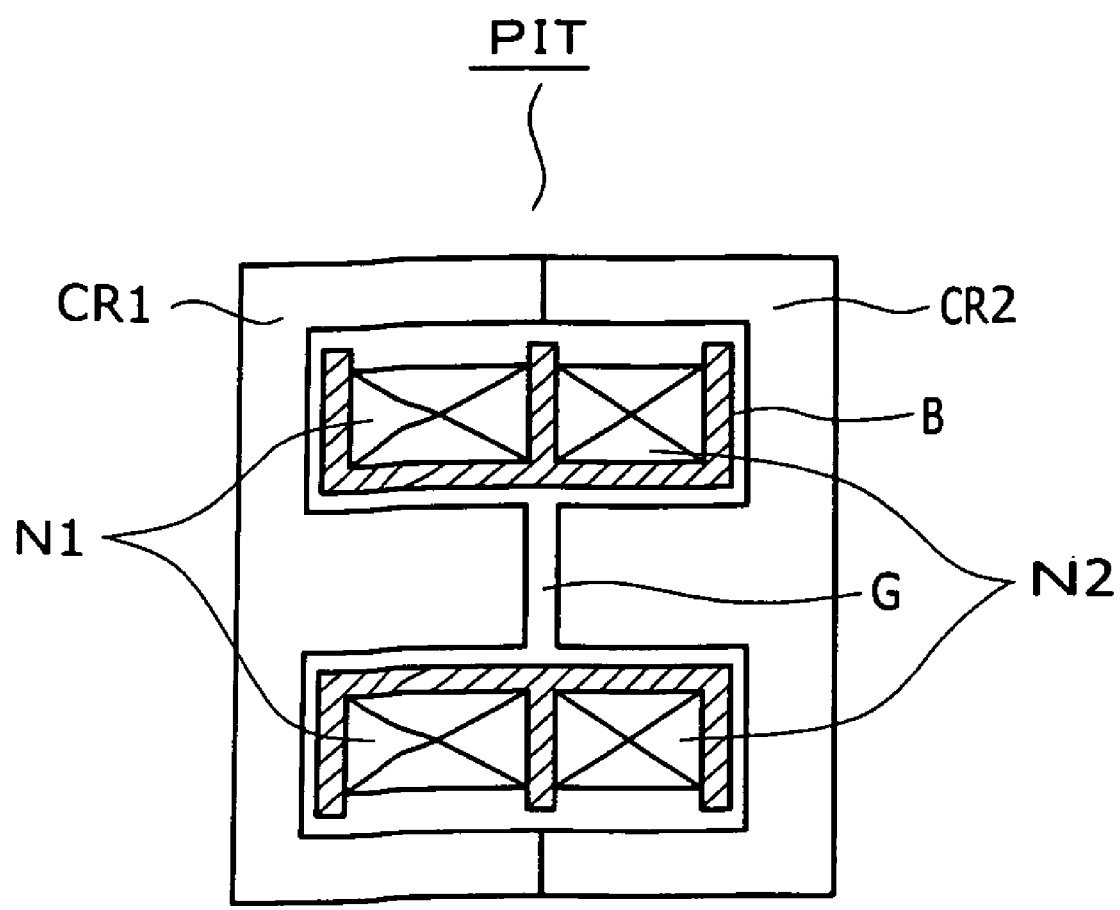
FIG. 2 is a diagram illustrating a configuration example of an isolation converter transformer included in a power supply circuit of one embodiment of the invention.

FIG. 2 is a sectional view illustrating a configuration example of the isolation converter transformer PIT included in the power supply circuit of FIG. 1.

As shown in FIG. 2, the isolation converter transformer PIT includes an EE-core (EE-shaped core) formed by combining E-cores CR1 and CR2 made of a ferrite material in such a manner that their magnetic legs face each other.

Furthermore, a bobbin B is provided that is formed of resin or the like and has such a divided shape that winding parts on the primary side and secondary side are independent of each other. The primary winding N1 is wound around one winding part of the bobbin B. The secondary winding N2 is wound around the other winding part. The bobbin B around which the primary-side and secondary-side windings have been thus wound is fitted to the EE-core (CR1, CR2), which results in the state in which the primary-side and secondary-side windings in the different winding regions are wound around the center leg of the EE-core. In this manner, the entire structure of the isolation converter transformer PIT is completed.

In the center leg of the EE-core, a gap G having a gap length of about 2 mm or more is formed as shown in the drawing. Thus, a loose coupling state is obtained in which the coupling coefficient k is about 0.7 or less for example. That is, the degree of loose coupling is further increased in the isolation converter transformer PIT in FIG. 2, compared with that in the power supply circuit shown in FIG. 9 as a conventional technique. The gap G can be formed by designing the center legs of the E-cores CR1 and CR2 to be shorter than two outer legs thereof.

As described above, one end of the primary winding N1 in the isolation converter transformer PIT is coupled to the drain of the switching element Q1. Thus, switching outputs from the switching element Q1 are transmitted to the primary winding N1, and an alternating voltage arises in the primary winding N1.

On the secondary side of the isolation converter transformer PIT, an alternating voltage induced by the primary winding N1 is generated in the secondary winding N2.

Connected in parallel to the secondary winding N2 is a secondary-side parallel resonant capacitor C2. Thus, the leakage inductance L2 of the secondary winding N2 and the capacitance of the secondary-side parallel resonant capacitor C2 form a secondary-side parallel resonant circuit. This secondary-side parallel resonant circuit implements resonant operation in response to rectifying operation of a secondary-side rectifier circuit to be described later. That is, voltage resonant operation is achieved not only on the primary side but also on the secondary side.

Furthermore, the present embodiment includes a secondary-side series resonant capacitor C3. One electrode of the secondary-side series resonant capacitor C3 is coupled to the connecting node between the winding-finish end of the secondary winding N2 and the secondary-side parallel resonant capacitor C2. The other electrode of the secondary-side series resonant capacitor C3 is coupled to the connecting node between the anode and the cathode of rectifier diodes Do1 and Do2, respectively, that form a secondary-side bridge rectifier circuit to be described later. This connecting structure leads to the formation of a series circuit of the secondary winding N2 and the secondary-side series resonant capacitor C3, in a rectified current path of the secondary-side rectifier circuit to be described later. Due to this series circuit configuration, the leakage inductance L2 of the secondary winding N2 and the capacitance of the secondary-side series resonant capacitor C3 form a secondary-side series resonant circuit. This secondary-side series resonant circuit also implements resonant operation (current resonant operation) in response to rectifying operation of the secondary-side rectifier circuit to be described later.

Thus, on the secondary side of the power supply circuit in FIG. 1, series resonant operation (current resonant operation) as well as the above-described parallel resonant operation (voltage resonant operation) is achieved.

The secondary-side rectifier circuit in the present embodiment is formed as a full-wave rectifier circuit (bridge full-wave rectifier circuit). For that purpose, a bridge rectifier circuit formed of four rectifier diodes Do1, Do2, Do3 and Do4, and one smoothing capacitor Co are coupled, in the following manner, to the secondary winding N2 to which the secondary-side parallel resonant capacitor C2 and the secondary-side series resonant capacitor C3 are connected as described above.

Specifically, the winding-finish end of the secondary winding N2 is coupled via the secondary-side series resonant capacitor C3 to the connecting node between the anode of the rectifier diode Do1 and the cathode of the rectifier diode Do2. The winding-start end of the secondary winding N2 is coupled to the connecting node between the anode of the rectifier diode Do3 and the cathode of the rectifier diode Do4. The cathodes of the rectifier diodes Do1 and Do3 are coupled to the positive electrode of the smoothing capacitor Co. The negative electrode of the smoothing capacitor Co is connected to the secondary-side ground. The anodes of the rectifier diodes Do2 and Do4 are also connected to the secondary-side ground.

In the thus formed full-wave rectifier circuit, during the periods of half cycles of one polarity (hereinafter, sometimes referred to as one half cycles) of the alternating voltage induced (excited) in the secondary winding N2, the pair of the rectifier diodes Do1 and Do4 in the bridge rectifier circuit conduct to thereby charge the rectified current in the smoothing capacitor Co. In contrast, during the periods of half cycles of the other polarity (hereinafter, sometimes referred to as the other half cycles) of the alternating voltage induced in the secondary winding N2, the pair of the rectifier diodes Do2 and Do3 conduct to thereby charge the rectified current in the smoothing capacitor Co.

Due to these operations, generated across the smoothing capacitor Co is the secondary-side DC output voltage Eo having the level equal to that of the alternating voltage induced in the secondary winding N2.

The thus obtained secondary-side DC output voltage Eo is supplied to a load (not shown), and is branched and input to a control circuit 1 to be described later as a detected voltage.

Moreover, in association with the rectifying operation of the full-wave rectifier circuit, voltage resonant operation by the secondary-side parallel resonant circuit and current resonant operation by the secondary-side series resonant circuit are achieved. In this configuration, the secondary-side rectifier circuit can be regarded as a circuit that rectifies and smoothes both resonant outputs from the secondary-side parallel resonant circuit and secondary-side series resonant circuit.

The control circuit 1 supplies to the oscillation and drive circuit 2 a detection output dependent upon a level change of the input secondary-side DC output voltage Eo. The oscillation and drive circuit 2 drives the switching element Q1 while varying the switching frequency according to the detection output input from the control circuit 1.

This variation control of switching frequency of the switching element Q1 leads to changes of resonant impedances of the primary and secondary sides of the power supply circuit. These impedance changes result in a change of the amount of power transmitted from the primary winding N1 to the secondary winding N2 in the isolation converter transformer PIT, and in a change of the amount of power to be supplied from the secondary-side rectifier circuit to a load. Thus, operation is achieved in which the level of the secondary-side DC output voltage Eo is controlled so that the level variation thereof is cancelled. That is, stabilization of the secondary-side DC output voltage Eo is allowed.

On the primary side of the power supply circuit in FIG. 1, an active clamp circuit 10 is provided.

The active clamp circuit 10 includes an auxiliary switching element Q2, a clamp capacitor CCL, and a clamp diode DD2. As the auxiliary switching element Q2, a MOS-FET is selected. The clamp diode DD2 is a body diode included in the auxiliary switching element Q2. The anode thereof is connected to the source of the auxiliary switching element Q2, while the cathode is connected to the drain of the auxiliary switching element Q2.

Furthermore, the active clamp circuit 10 includes, as drive circuitry for driving the auxiliary switching element Q2, a drive winding Ng, a capacitor Cg, a gate resistor Rg, and a resistor R1 between the gate and source.

Note that hereinafter, the switching element Q1 of the single-ended voltage resonant converter is referred to also as a main switching element Q1, for differentiation from the auxiliary switching element Q2.

The drain of the auxiliary switching element Q2 is connected to one electrode of the clamp capacitor CCL. The other electrode of the clamp capacitor CCL is coupled to the connecting node between the line of the rectified and smoothed voltage Ei and the winding-finish end of the primary winding N1. The source of the auxiliary switching element Q2 is coupled to the winding-start end of the primary winding N1.

That is, in the active clamp circuit 10 of the present embodiment, the clamp capacitor CCL is connected in series to the parallel circuit of the auxiliary switching element Q2 and the clamp diode DD2. In addition, the thus formed circuit is connected in parallel to the primary winding N1 of the isolation converter transformer PIT.

In the drive circuitry for the auxiliary switching element Q2, the resistor R1 is interposed between the gate and source of the auxiliary switching element Q2 as shown in the drawing. In addition, the gate of the auxiliary switching element Q2 is coupled to the series circuit of the resistor Rg, the capacitor Cg and the drive winding Ng. This series circuit and the resistor R1 form a self-excited oscillation and drive circuit for the auxiliary switching element Q2. The drive winding Ng is formed by further turning up the winding-start end of the primary winding N1 in the isolation converter transformer PIT. The number of turns of the drive winding Ng is for example 1 T (turn). Thus, generated in the drive winding Ng is a voltage induced by an alternating voltage arising in the primary winding N1. Due to the relationship between the winding directions of the primary winding N1 and the drive winding Ng, the voltage arising in the drive winding Ng has the polarity opposite to that of the voltage arising in the primary winding N1. The actual operation of the drive winding Ng is ensured as long as the number of turns thereof is at least 1 T. However, the number of turns is not limited to 1 T.

As described later in detail, the active clamp circuit 10 operates so as to suppress the peak level of a voltage resonant pulse that is generated during the OFF period of the main switching element Q1 as the switching voltage (parallel resonant voltage) V1 arising across the parallel circuit of the main switching element Q1 and the primary-side parallel resonant capacitor Cr.

The characteristics of major parts in an actual power supply circuit having the configuration of FIG. 1 are as follows for example. Note that 300 W and 0 W (no load) are the maximum load power Pomax and the minimum load power Pomin, respectively, in the allowable load power range of this power supply circuit.

The core of the isolation converter transformer PIT employs an EER-35 core, and a gap G is designed to have a gap length of 2.2 mm. The numbers of turns of the primary winding N1 and the secondary winding N2 are set to 55 T and 50 T, respectively. The induced voltage per one turn in the secondary winding N2 is set to about 2.5 V/T or higher. The leakage inductance L1 of the primary winding N1 is 350 µH, and the leakage inductance L2 of the secondary winding N2 is 332 µH. According to these conditions, the coupling coefficient k of the isolation converter transformer PIT is 0.685.

As is well known, the above-described EER type is one of types and standards of product cores. It is known that the types also include an EE type. The sectional shapes of cores of the EER and EE types are both an EE-character shape. Therefore, the term EE-core in the present specification encompasses both cores of the EER and EE types.

As the main switching element Q1, a product of which breakdown current and voltage are 10 A and 600 V, respectively, is selected.

The capacitance of the primary-side parallel resonant capacitor Cr is set to 2200 pF. The capacitance of the secondary-side parallel resonant capacitor C2 is set to 8200 pF. The capacitance of the secondary-side series resonant capacitor C3 is set to 0.022 µF.

The parts in the active clamp circuit 10 are designed as follows: the clamp capacitor CCL has a capacitance of 0.056 µF; the number of turns of the drive winding Ng is 1 T; the capacitor Cg has a capacitance of 0.033 µF; the gate resistor Rg has a resistance of 4.7 Ω; the resistor R1 between the gate and source has a resistance of 1 kΩ. As the auxiliary switching element Q2, a product of which breakdown current and voltage are 10 A and 600 V, respectively, is selected.

In the present embodiment, the resonant frequency fo1 of the power supply circuit in FIG. 1 is treated as follows.

As shown in the waveform diagram of FIGS. 3A and 3B to be described later, the operation of the primary-side switching converter in the power supply circuit in FIG. 1 can be regarded as complex operation between the switching operation of the voltage resonant converter (the main switching element Q1) and that of the active clamp circuit 10. In addition, this complex operation can be regarded as equivalent to the state in which one primary-side parallel resonant circuit (hereinafter, a primary-side parallel resonant circuit a) and another parallel resonant circuit (hereinafter, a primary-side parallel resonant circuit b) operate in a complex manner on the primary side. The circuit a is formed of the primary-side parallel resonant capacitor Cr and the leakage inductance L1 of the primary winding N1. The circuit b is formed of the clamp capacitor CCL and the leakage inductance L1 of the primary winding N1. In this case, the primary-side parallel resonant circuit a can be treated as a circuit that implements resonant operation during the period when the main switching element Q1 is in the on-state. The primary-side parallel resonant circuit b can be treated as a circuit that implements resonant operation during the period when the auxiliary switching element Q2 is in the on-state.

The resonant frequency fo1a of the primary-side parallel resonant circuit a is 181.5 kHz since the capacitance of the primary-side parallel resonant capacitor Cr is 2200 pF and the leakage inductance L1 of the primary winding N1 is 350 µH. The resonant frequency fo1b of the primary-side parallel resonant circuit b is 36 kHz since the capacitance of the clamp capacitor CCL is 0.056 µF and the leakage inductance L1 of the primary winding N1 is 350 µH. In this manner, the primary side of the circuit in FIG. 1 involves two different resonant frequencies of two primary-side parallel resonant circuits. Therefore, in the present embodiment, the parallel resonant frequency fo1 when these primary-side parallel resonant circuits are regarded as one integrated circuit, is expressed by the equation fo1=(fo1$a$+fo1$b$)/2. That is, the average value of the resonant frequencies fo1$a$ and fo1$b$ of the primary-side parallel resonant circuits a and b, respectively, is treated as the parallel resonant frequency fo1 of the primary-side parallel resonant circuit. In the present embodiment, fo1 is 108.8 kHz (108.75 kHz) since fo1=(181.5 kHz+36 kHz)/2.

That is, the resonant frequency fo1 in the present embodiment is the resonant frequency of the primary-side parallel resonant circuit, obtained due to the operation of the primary-side switching converter, including the operation of the active clamp circuit 10. Therefore, the following concept regarding resonant frequency design is available. Specifically, the resonant frequency fo1$a$ of the primary-side parallel resonant circuit a, which includes the capacitance of the primary-side parallel resonant capacitor Cr as its component, is designed so that the resonant frequency fo1, which is due to the existence of the active clamp circuit 10 and is expressed by the equation fo1=(fo1$a$+fo1$b$)/2, has a requisite value.

The resonant frequency fo2 of the secondary-side parallel resonant circuit is 96.5 kHz since the capacitance of the secondary-side parallel resonant capacitor C2 is 8200 pF and the leakage inductance L2 of the secondary winding N2 is 332 µH.

The resonant frequency fo3 of the secondary-side series resonant circuit is 58.9 kHz since the capacitance of the secondary-side series resonant capacitor C3 is 0.022 µF and the leakage inductance L2 of the secondary winding N2 is 332 µH.

In the present embodiment, the relative relationship among the resonant frequencies fo1, fo2 and fo3 is as follows. Specifically, the resonant frequency fo1 can be regarded as almost equal to the resonant frequency fo2. In addition, the resonant frequency fo3 is smaller than these resonant frequencies fo1 and fo2. That is, it can be deemed that these resonant frequencies are designed to have the relationship in which fo1 nearly equals fo2 and is larger than fo3.

The waveform diagrams in FIGS. 3A and 3B show the operations of major parts in the power supply circuit of FIG. 1 having the above-described configuration, with reflecting the switching cycle of the switching element Q1. FIG. 3A shows the switching voltage V1, a switching current IQ1, a clamp current IQ2, a current Icr, a primary winding current I1, and a secondary winding current I2 when the load power is the maximum load power Pomax of 300 W. FIG. 3B shows the waveforms of these currents and voltage when the load power is the minimum load power Pomin of 0 W.

The switching voltage V1 is the voltage between the drain and source of the switching element Q1, and is also the voltage across the parallel resonant capacitor Cr. The switching current IQ1 is the current flowing through the switching element Q1 (and the body diode DD). The switching voltage V1 and the switching current IQ1 indicate the ON/OFF timings of the switching element Q1. One switching cycle is divided into the period TON during which the switching element Q1 should be in the on-state, and the period TOFF during which it should be in the off-state. The switching voltage V1 has a waveform in which the voltage is at 0 level during the period TON, and is obtained as a voltage resonant pulse during the period TOFF. The voltage resonant pulse as the switching voltage V1 is originally obtained as a sinusoidal resonant waveform since the operation of the primary-side switching converter is voltage resonant operation. However, in the present embodiment, the operation to be described later of the active clamp circuit 10 offers a modified waveform in which the peak of the voltage resonant pulse is suppressed.

The switching current IQ1 is at 0 level during the period TOFF. When the period TOFF ends and the period TON starts, i.e. at the timing of turn on of the switching element Q1, initially the switching current IQ1 flows through the body diode DD and therefore has the negative polarity. Subsequently, the switching current IQ1 flows from the drain to the source, and thus the polarity thereof is inverted to the positive polarity. This waveform of the switching current IQ1 indicates that zero volt switching (ZVS) and zero current switching (ZCS) are adequately implemented. In addition, the switching current IQ1 can be regarded as a current that flows to the main switching element Q1 via the leakage inductance L1 arising in the primary winding N1 in the isolation converter transformer PIT.

The primary winding current I1 is the current flowing through the primary winding N1, and results from the synthesis between the current flowing through the switching element Q1 and the current flowing to the primary-side parallel resonant capacitor Cr. The waveform of the primary winding current I1 during the period TOFF corresponds to the waveform of the current flowing to the primary-side parallel resonant capacitor Cr.

An alternating voltage is induced in the secondary winding N2. Thus, during the periods when the secondary winding voltage has a positive level larger than a certain level, i.e. during part of the periods of one half cycles of the secondary winding voltage, the pair of the rectified diodes Do1 and Do4 conduct. In these conductive periods, the rectified current flows to the smoothing capacitor Co. In contrast, during the periods when the secondary winding voltage has a negative level of which absolute value is larger than a certain value, i.e. during part of the periods of the other half cycles of the secondary winding voltage, the pair of the rectified diodes Do2 and Do3 conduct. In these conductive periods, the rectified current flows to the smoothing capacitor Co.

The secondary winding current I2 is obtained as a result of the synthesis between the current flowing to the secondary-side parallel resonant capacitor C2, and the rectified currents of the both half cycles, flowing through the pair of the rectified diodes Do1 and Do4, and the pair of the rectified diodes Do2 and Do3. Although not shown in FIG. 3B, when the load power is the minimum load power Pomin of 0 W, the rectified current through the rectified diodes is at 0 level even in the periods during which the rectified diodes Do1 and Do4, or the rectified diodes Do2 and Do3 conduct.

In the waveform diagrams of FIGS. 3A and 3B, the operation of the active clamp circuit 10 is indicated with being classified into five-stage operation modes from mode 1 to mode 5 that sequentially proceed in one switching cycle.

During the period TON when the main switching element Q1 is in the on-state, the active clamp circuit 10 implements the operation mode 1. During the period TON, the auxiliary switching element Q2 is in the off-state. That is, the operation mode 1 implements control so that the auxiliary switching element Q2 is kept at the off-state.

In the operation mode 1 (during the period TON), the switching current IQ1 has the above-described waveform.

Specifically, immediately after turn on of the switching element Q1, the switching current IQ1 flows through the clamp diode DD with the negative polarity. Thereafter, the polarity is inverted, and thus the switching current IQ1 flows in the direction from the drain to the source of the main switching element Q1 with the positive polarity.

During the period when the switching current IQ1 flows with the negative polarity, the clamp diode DD conducts since discharging of the primary-side parallel resonant capacitor Cr has finished at the end of a period td2, which is just anterior to the period of the negative switching current IQ1. Thus, the switching output current IQ1 flows via the clamp diode DD and the primary winding N1 in that order, which regenerates power for the power supply. That is, the period of the negative switching current IQ1 corresponds to a mode of regenerating power for the power supply. After the completion of the power regeneration operation, a current is supplied from the smoothing capacitor Ci via the primary winding N1, so that the switching current IQ1 flows between the source and drain of the main switching element Q1.

When the period TON corresponding to the operation mode 1 ends and the period TOFF starts, a period td1 corresponding to operation mode 2 is initialized.

During the period td1, the main switching element Q1 is turned off, and therefore the current through the primary winding N1 flows as a current Icr shown in FIGS. 3A and 3B to charge the primary-side parallel resonant capacitor Cr. At this time, the charging current that flows to the primary-side parallel resonant capacitor Cr has a pulse-like waveform of the positive polarity. This pulse waveform corresponds to the operation of a partial resonant mode. In addition, at this time, the main switching element Q1 is turned off by ZVS since the primary-side parallel resonant capacitor Cr is connected in parallel to the main switching element Q1.

Subsequently to the period td1, a period starts in which control is implemented so that the auxiliary switching element Q2 is turned on while the main switching element Q1 is kept at the off-state. This period corresponds to a period TON2 shown in FIGS. 3A and 3B. In this manner, ON/OFF of the auxiliary switching element Q2 is controlled so that it is in the on-state within the period during which the main switching element Q1 is in the off-state.

This period TON2 is the period during which the active clamp circuit 10 operates. During the period TON2, initially operation mode 3 is carried out, which is then followed by operation mode 4.

Due to the foregoing operation mode 2, the primary-side parallel resonant capacitor Cr is charged by the current Icr flowing via the primary winding N1 to the primary-side parallel resonant capacitor Cr. Thus, in the operation mode 3 subsequent to the operation mode 2, the voltage level of the primary winding N1 is equal to or higher than the voltage level across the clamp capacitor CCL at the initial timing (at the start of the period TON2). This voltage level is high enough that the clamp diode DD2 connected in parallel to the auxiliary switching element Q2 conducts. Thus, a current flows through the clamp diode DD2 and the clamp capacitor CCL in that order. Accordingly, the clamp current IQ2 has a sawtooth waveform in which the voltage level rises with time from a negative level toward 0 after the start of the period TON2 shown in FIGS. 3A and 3B.

As described above, the capacitance of the clamp capacitor CCL is 0.056 μF, while the capacitance of the primary-side parallel resonant capacitor Cr is 2200 pF, for example. Therefore, the capacitance of the primary-side parallel resonant capacitor Cr is considerably smaller than that of the clamp capacitor CCL. Due to such selection of the capacitances of the clamp capacitor CCL and the primary-side parallel resonant capacitor Cr, most of the current flows to the clamp capacitor CCL as the clamp current IQ2 while almost no current flows to the primary-side parallel resonant capacitor Cr, in the operation mode 3. As a result, the amount of charging current to the primary-side parallel resonant capacitor Cr during the period TON2 is reduced. Therefore, the slope of the voltage resonant pulse as the switching voltage V1 is made gentler, which suppresses the peak level V1$p$ of the switching voltage V1. That is, clamp operation for the voltage resonant pulse is achieved.

It should be noted that, if the configuration in FIG. 1 has no active clamp circuit 10, the voltage resonant pulse has for example a steep sinusoidal waveform since charging and discharging currents flow during the whole period TOFF. The peak level of the voltage resonant pulse is higher than that in a configuration including the active clamp circuit 10.

After the end of the operation mode 3 in the period TON2, the operation sequence moves to the operation mode 4.

The start timing of the operation mode 4 is equivalent to the timing at which the flow direction of the clamp current IQ2 shown in FIGS. 3A and 3B is inverted from the negative direction to the positive direction. At the timing of the polarity inversion of the clamp current IQ2 from the negative polarity to the positive polarity, the auxiliary switching element Q2 is turned on by ZVS and ZCS. In the state in which the auxiliary switching element Q2 thus conducts, the resonant operation obtained at this time by the primary-side parallel resonant circuit allows the clamp current IQ2 to flow via the primary winding N1 and the clamp capacitor CCL in that order, and thus flow from the drain to the source of the auxiliary switching element Q2. Therefore, the clamp current IQ2 has a waveform in which the positive voltage level increases with time as shown in FIGS. 3A and 3B.

The voltage applied to the gate of the auxiliary switching element Q2 is the voltage induced in the drive winding Ng, although not shown in the drawings. This voltage is a rectangular waveform pulse voltage.

The periods td1 and td2 correspond to threshold periods during which both the main switching element Q1 and the auxiliary switching element Q2 are in the off-state. These threshold periods are held by the flow of the gate-flowing current.

The operation mode4 is completed at the timing of start of rise up of the voltage across the auxiliary switching element Q2. Before the rise up, this voltage is at 0 level in the period TOFF since the auxiliary switching element Q2 conducts. Subsequent to the operation mode 4, the operation sequence moves to operation mode 5 during the period td2.

In the operation mode 5, a discharging current flows from the primary-side parallel resonant capacitor Cr to the primary winding N1. That is, partial resonant operation is achieved. In FIGS. 3A and 3B, this discharging as the partial resonant operation is indicated by the current Icr flowing to the primary-side parallel resonant capacitor Cr, as a pulse waveform current of the negative polarity flowing only during the period td2.

During the period td2, the voltage resonant pulse of the switching voltage V1 applied to the main switching element Q1 has a steep slope since the capacitance of the primary-side parallel resonant capacitor Cr is smaller than that of the clamp capacitor CCL also as described above. Therefore, in the period td2, the voltage level rapidly falls down toward 0 as shown in the waveform diagram.

At the timing of start of the operation mode 5 after the end of the operation mode 4, the turn off of the auxiliary switching element Q2 is initialized. This turn off operation is carried out based on ZVS since the voltage resonant pulse (the switching voltage V1) falls down with a certain slope.

The active clamp circuit 10 implements the above-described operations mode 1 to mode 5 in each one switching cycle.

Based on the above-described operations of the respective parts, a comparison will be made between the waveforms when the load power is the maximum load power Pomax of 300 W shown in FIG. 3A, and those when it is the minimum load power Pomin of 0 W shown in FIG. 3B. First, the comparison shows that, in the operation of the primary-side switching converter, as the load becomes lighter, the period length of one switching cycle (TOFF+TON) becomes shorter, i.e., the switching frequency fs becomes higher. This period length variation indicates that the above-described switching frequency control operation for varying the switching frequency fs depending on load variation is achieved as constant-voltage control operation.

In the present embodiment, the lighter the load is, the higher the switching frequency becomes as described above. In addition, as the load becomes lighter, the length ratio of the period TOFF to the period TON in one switching cycle becomes larger, i.e., the duty ratio of the period TON to the period TOFF becomes smaller. This duty ratio decrease is due to the suppression of the peak level V1$p$ of the voltage resonant pulse (V1) by the active clamp circuit 10. When the peak level V1$p$ of the voltage resonant pulse (V1) is suppressed, the conduction angle of the voltage resonant pulse is correspondingly increased. As is also apparent from FIGS. 3A and 3B, when the load becomes lighter, the peak level V1$p$ of the voltage resonant pulse (V1) is suppressed. In association with this suppression, the conduction angle of the voltage resonant pulse (V1) is increased. This increase of the conduction angle is indicated as a change of the duty ratio between the periods TON and TOFF in one switching cycle.

As described above, the capacitance of the clamp capacitor CCL is considerably larger than that of the primary-side parallel resonant capacitor Cr. A larger difference between the capacitances of the primary-side parallel resonant capacitor Cr and the clamp capacitor CCL results in a larger degree of suppression of the voltage resonant pulse peak. This larger peak suppression however offers a larger increase of the conduction angle of the voltage resonant pulse (V1). When the conduction angle of the voltage resonant pulse (V1) in one switching cycle is increased, that is, when the period (TOFF) during which the main switching element Q1 is in the off-state is extended, the ON period (TON) of the main switching element Q1 is correspondingly shortened. If the extent of shortening of the ON period (TON) exceeds a certain level, there arise problems, in some cases, of switching loss in the main switching element Q1 and lowering of amount of power transmitted from the primary side to the secondary side. In the present embodiment, the capacitances of the clamp capacitor CCL and the primary-side parallel resonant capacitor Cr are selected (CCL=0.056 µF and Cr=2200 pF), based on results of experiments and so on that were carried out in consideration of the balance among the requisite suppression level of the voltage resonant pulse peak, switching loss, power transmission amount, and so forth. By this capacitance selection, the relationship in which CCL nearly equals Cr×25 is achieved.

Figure 4:
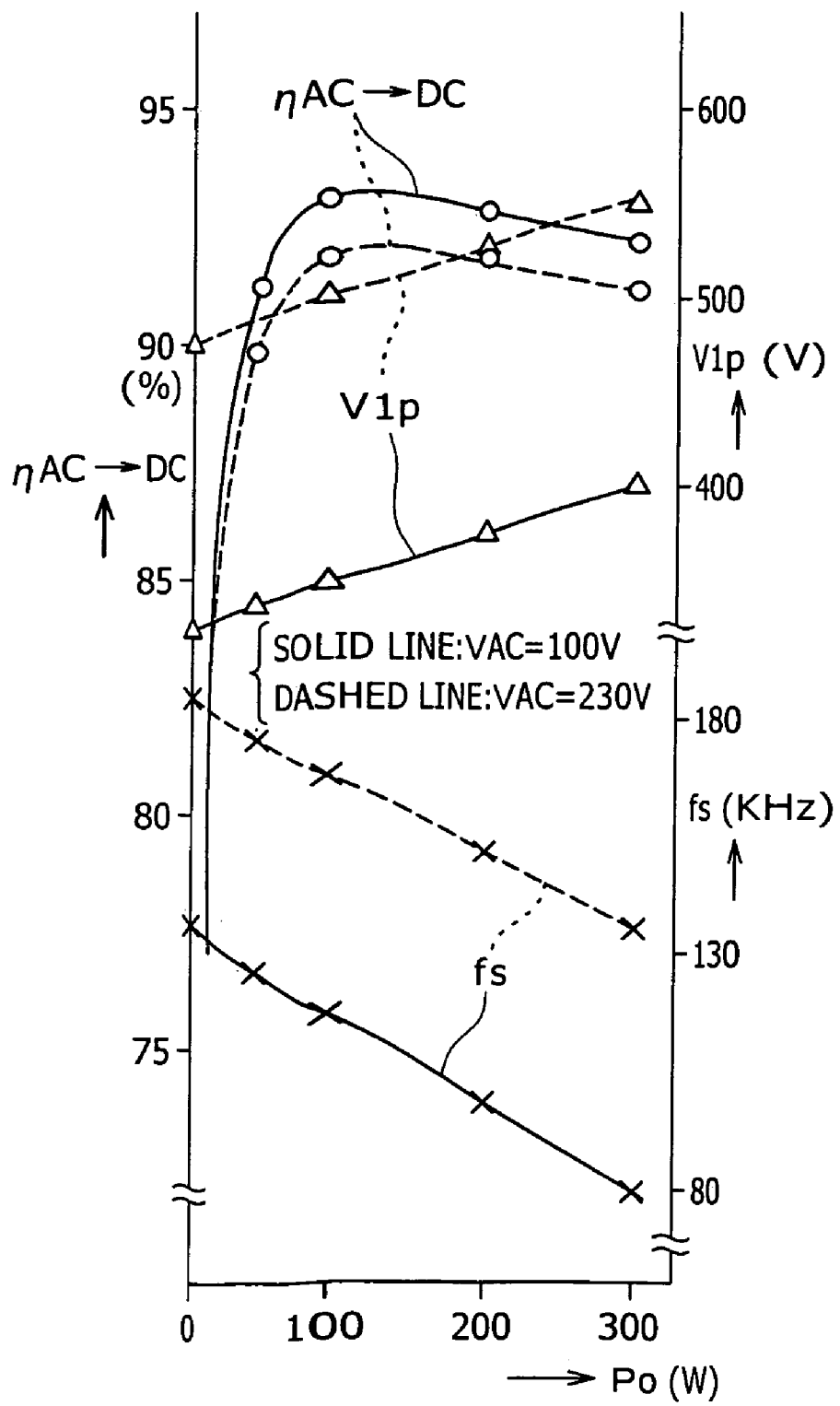
FIG. 4 is a diagram showing, as a function of load, the variation characteristics of the AC to DC power conversion efficiency, the switching frequency, and the peak level of a voltage resonant pulse, regarding the power supply circuit of the first embodiment.

FIG. 4 shows, as a function of load (from Pomin of 0 W to Pomax of 300 W), the variation characteristics of the AC to DC power conversion efficiency ($\eta$AC→DC), the switching frequency fs, and the peak level V1$p$ of the voltage resonant pulse (the switching voltage V1) regarding the power supply circuit of FIG. 1. These Characteristic curves are based on the results of experiments on the power supply circuit of FIG. 1, and correspond to the AC input voltages VAC of 100 V and 230 V, respectively.

Figure 3:
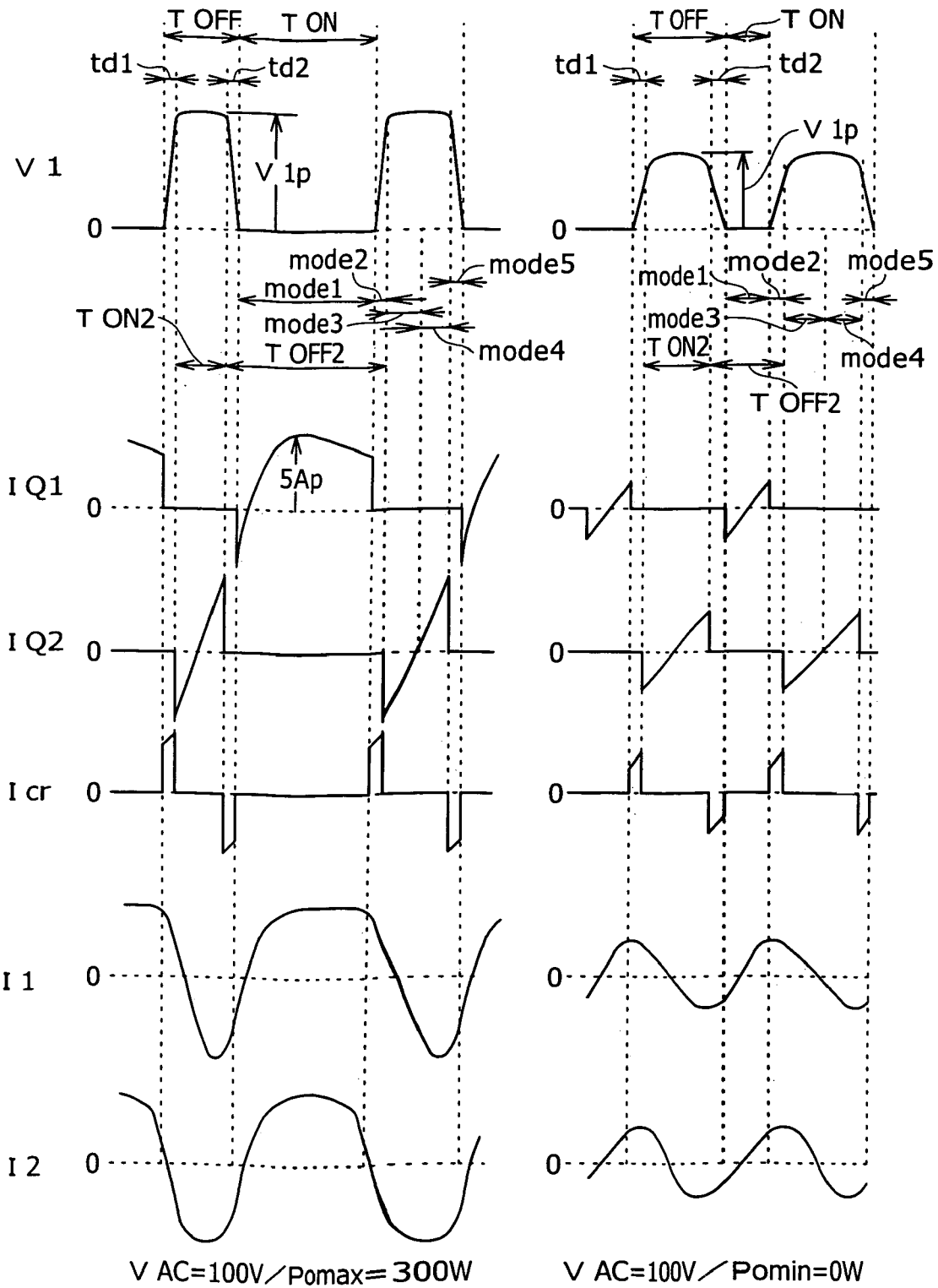
FIGS. 3A and 3B are waveform diagrams showing the operation of major parts in the power supply circuit of the first embodiment, with reflecting the corresponding switching frequency.

According to FIG. 4, the switching frequency fs increases as the load becomes lighter also as described with FIG. 3. Furthermore, the switching frequency fs increases as the AC input voltage VAC becomes higher. This frequency change tendency indicates that, in the constant-voltage control operation, the switching frequency fs is made higher when the secondary-side DC output voltage Eo increases in response to a load decrease and an AC input voltage increase.

The specific values about the switching frequency fs are as follows. When the AC input voltage VAC is 100 V, the range of the switching frequency fs for addressing the load variation range from the maximum load power Pomax of 300 W to the minimum load power Pomin of 0 W is from 80.0 kHz to 135.0 kHz. Therefore, $\Delta$fs is 55.0 kHz. The variation ranges of lengths of the periods TON and TOFF corresponding to this switching frequency range are from 8.5 µs to 2.9 µs, and from 4.0 µs to 4.5 µs, respectively.

When the AC input voltage VAC is 230 V, the range of the switching frequency fs for addressing the same load variation range from 300 W to 0 W is from 136.0 kHz to 181.8 kHz. Therefore, $\Delta$fs is 45.8 kHz. The variation ranges of lengths of the periods TON and TOFF corresponding to this switching frequency range are from 2.9 µs to 0.5 µs, and from 4.5 µs to 5.0 µs, respectively.

As for the AC to DC power conversion efficiency ($\eta$AC→DC), a lighter load offers a higher efficiency in the load power range from the maximum load power Pomax of 300 W to load power Po of about 100 W. In contrast, in the load power range lower than about 100 W, a lighter load offers a lower efficiency.

The measurement results on the AC to DC power conversion efficiencies ($\eta$AC→DC) when the load power was the maximum load power Pomax of 300 W were obtained: the efficiency $\eta$AC→DC was 92.3% when the AC input voltage VAC was 100 V, and the efficiency $\eta$AC→DC was 91.2% when the AC input voltage VAC was 230 V.

The peak level V1$p$ of the voltage resonant pulse (V1) increases as the load becomes heavier. This peak level rise corresponds to the increase of amount of current charged in the primary-side parallel resonant capacitor Cr in association with the increase of amount of current flowing through the switching converter due to the load power increase. The measurement results were obtained about the peak levels V1$p$ when the load power was the maximum load power Pomax of 300 W, which offered the maximum peak levels. Specifically, the peak level V1$p$ was about 400 Vp when the AC input voltage VAC was 100 V, and the peak level V1$p$ was about 550 Vp when the AC input voltage VAC was 230 V.

Since the peak level V1$p$ of the voltage resonant pulse (V1) takes these values, a product of which breakdown voltage is 600 V (e.g. T0-220 package) can be used as the main switching element Q1 as described above. In addition, also as the auxiliary switching element Q2, a product of which breakdown voltage is 600 V can be used similarly. In the power supply circuit in FIG. 9 for example, although the maximum load power Pomax thereof is 200 W, which is lower than that of the present embodiment, a product of a breakdown voltage of 900 V is required as the switching element Q1. If the active clamp circuit 10 is removed from the power supply circuit of FIG. 1, of which maximum load power Pomax is 300 W, a product of a breakdown voltage of 1200 V (e.g. T0-3P package) needs to be used as the switching element Q1. That is, in the present embodiment, lower-breakdown-voltage parts can be selected as the main switching element Q1 (and the auxiliary switching element Q2), the primary-side parallel resonant capacitor Cr connected in parallel to the main switching element Q1, and so on.

Since low-breakdown-voltage parts can be thus selected as the respective parts, the characteristics of these parts elements can be enhanced. For example, the switching characteristic of the main switching element Q1 is further improved, which reduces power loss and improves the circuit reliability. In addition, lower-breakdown-voltage parts have small sizes, which can promote size and weight reductions of circuit boards. Moreover, costs of parts can be reduced.

Figure 9:
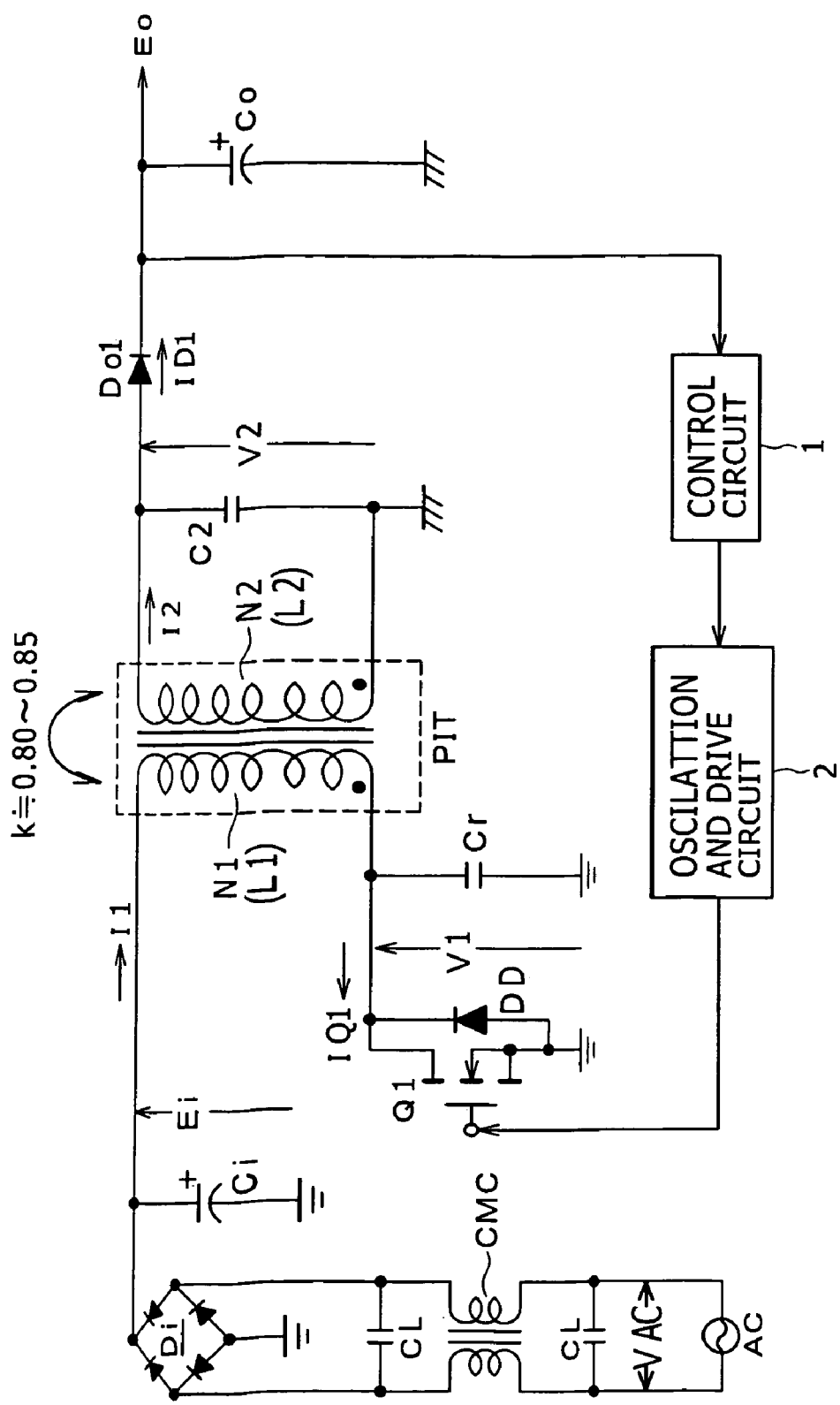
FIG. 9 is a circuit diagram illustrating a configuration example of a power supply circuit as a conventional circuit.
Figure 11:
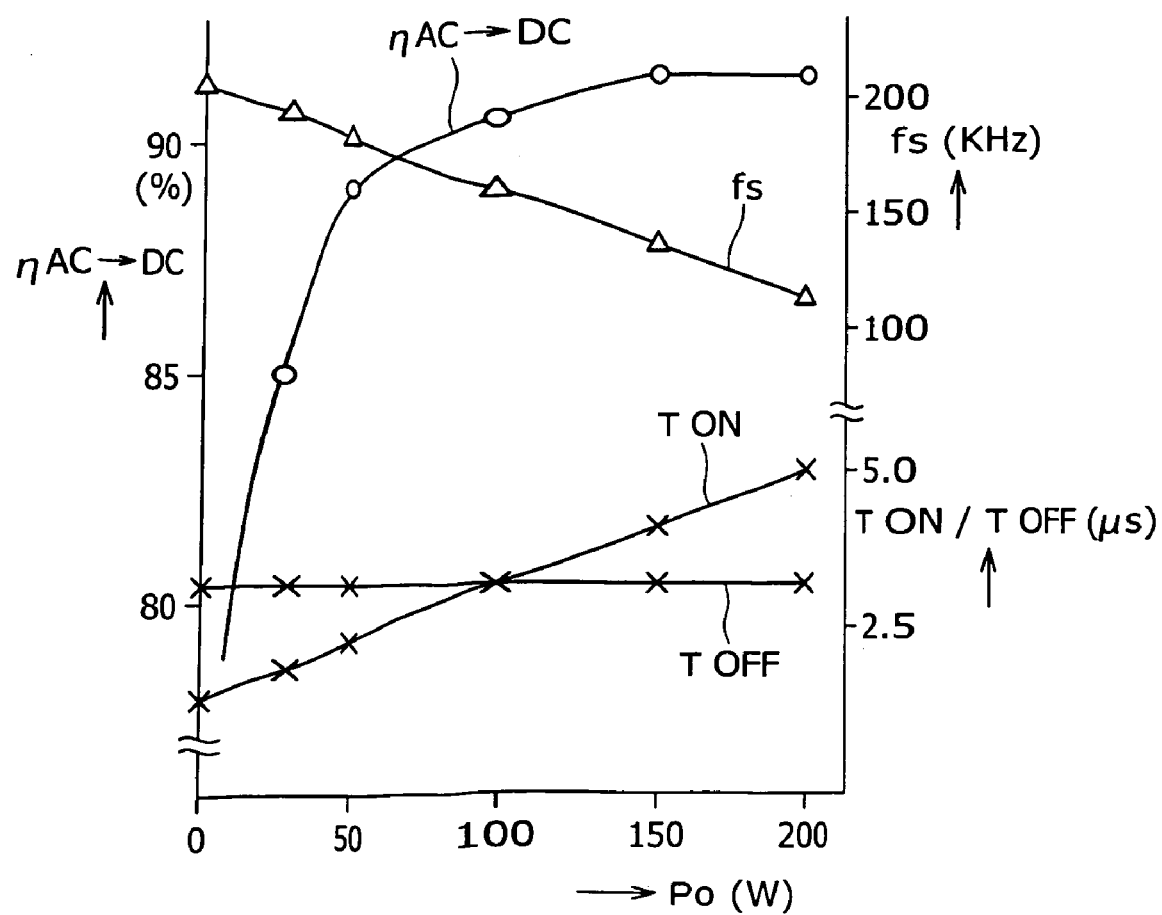
FIG. 11 is a diagram showing, as a function of load, the variation characteristics of the AC to DC power conversion efficiency, the switching frequency, and the ON period and OFF period of a switching element, regarding the power supply circuit in FIG. 9.

Of the characteristics of the power supply circuit in FIG. 1, the characteristic of the switching frequency fs will be compared with that of the power supply circuit in FIG. 9.

In the power supply circuit of FIG. 9, when the AC input voltage VAC was 100 V, the requisite range of the switching frequency fs for the load power variation from the maximum load power Pomax of 300 W to the minimum load power Pomin of 0 W was from 117.6 kHz to 208.3 kHz. Therefore, Δfs was 96.7 kHz.

In contrast, in the power supply circuit of FIG. 1, when the AC input voltage VAC is 100 V, the requisite range of the switching frequency fs for the load power variation from the maximum load power Pomax of 300 W to the minimum load power Pomin of 0 W is from 8.0 kHz to 135.0 kHz, and therefore Δfs is 55.0 kHz. This requisite control range is significantly smaller than that of the power supply circuit of FIG. 9. In addition, in the power supply circuit of FIG. 1, when the AC input voltage VAC is 230 V, the requisite range of the switching frequency fs for the load power variation from the maximum load power Pomax of 300 W to the minimum load power Pomin of 0 W is from 136.0 kHz to 181.8 kHz, and therefore Δfs is 45.8 kHz. That is, also when the AC input voltage VAC is 230 V, a requisite control range significantly smaller than that of the power supply circuit of FIG. 9 is achieved.

These characteristics of the switching frequency fs of the power supply circuit in FIG. 1 indicate that a so-called wide-range compatible circuit is allowed that can stably operate compatibly with commercial AC voltage inputs in the range of the AC 100 V-system to the AC 200 V-system (e.g. the voltage VAC in the range of 85 V to 264 V), under the condition of load power variation from the maximum load power Pomax of 300 W to the minimum load power Pomin of 0 W. This respect will be described below.

The power supply circuit in FIG. 1 has, as its basic configuration, a voltage resonant converter that is provided with both a secondary-side parallel resonant circuit and a secondary-side series resonant circuit as a secondary-side resonant circuit. In this configuration, the combination of the primary-side parallel resonant circuit and secondary-side parallel resonant circuit dominantly contributes to achievement of a wide-range compatible circuit.

When attention is focused on the combination of the primary-side parallel resonant circuit and secondary-side parallel resonant circuit as the configuration of the power supply circuit in FIG. 1, it is deemed that the power supply circuit in FIG. 1 has a parallel resonant circuit on each of the primary and secondary sides with the intermediary of electromagnetic coupling by the isolation converter transformer PIT between the parallel resonant circuits. If this configuration is interpreted from a viewpoint of the relationship between the primary-side parallel resonant circuit and secondary-side resonant circuit, the power supply circuit in FIG. 1 can be regarded as equal to an electromagnetically coupled resonant circuit that is fed with a frequency signal dependent upon the switching frequency fs.

The constant-voltage control characteristic for the secondary-side DC output voltage Eo of the power supply circuit in FIG. 1, which can be thus regarded as including an electromagnetically coupled resonant circuit, differs depending on the coupling degree (the coupling coefficient k) of the isolation converter transformer PIT. This respect will be described with reference to FIG. 5.

Figure 5:
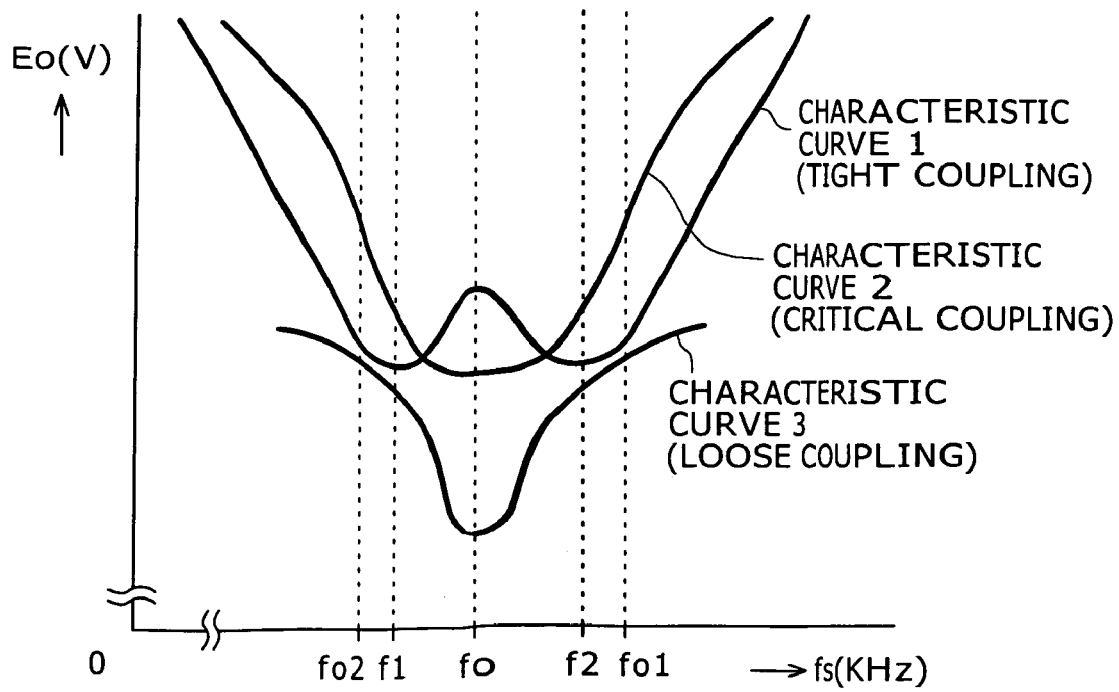
FIG. 5 is a diagram illustrating the constant-voltage control characteristic of a power supply circuit of one embodiment of the invention.

FIG. 5 shows the output characteristic of the electromagnetically coupled resonant circuit with respect to the input (switching frequency signal) thereto. Specifically, the characteristic of controlling the secondary-side DC output voltage Eo is indicated based on the relationship between the voltage Eo and the switching frequency fs. In FIG. 5, switching frequencies are plotted on the abscissa while the levels of the secondary-side DC output voltage Eo are plotted on the ordinate.

As is described with FIG. 1, in the present embodiment, the resonant frequency fo1 of the primary-side parallel resonant circuit is set to about 1.5 times the resonant frequency fo2 of secondary-side parallel resonant circuit. Therefore, the resonant frequency fo1 is higher than the resonant frequency fo2. Referring to FIG. 5, the resonant frequencies fo1 and fo2 are shown on the abscissa, on which the switching frequencies fs are plotted. Also in FIG. 5, such indication is made that the resonant frequency fo1 is higher than the resonant frequency fo2 in association with the above-described relationship therebetween.

When the isolation converter transformer PIT employs tight coupling in which the coupling coefficient k is 1, the leakage inductance L1 of the primary winding N1 and the leakage inductance L2 of the secondary winding N2 are both 0.

When the primary side and secondary side of the isolation converter transformer PIT are thus tightly coupled, the constant-voltage control characteristic draws a so-called bimodal curve as shown by Characteristic curve 1 in FIG. 5. In this curve, the secondary-side DC output voltage Eo comes to peaks when the switching frequency is at frequency values of f1 and f2 that are different from the resonant frequencies fo1 and fo2 of the primary-side and secondary-side parallel resonant circuits, respectively.

The frequency f1 is expressed by Equation 1.

$$f1 = fo/\sqrt{1+k} \qquad \text{Equation 1}$$

The frequency f2 is expressed by Equation 2.

$$f2 = fo/\sqrt{1-k} \qquad \text{Equation 2}$$

In Equations 1 and 2, fo, which is one of the terms, denotes the center resonant frequency that exists at the center between the resonant frequency fo1 of the primary-side parallel resonant circuit and the resonant frequency fo2 of the secondary-side parallel resonant circuit. The center resonant frequency is determined depending on the impedance of the primary side, the impedance of the secondary side, and the impedance common to the primary and secondary sides (mutual coupling inductance M).

The mutual coupling inductance M is expressed by Equation 3.

$$M = k\sqrt{L1 \times L2} \qquad \text{Equation 3}$$

If the coupling coefficient k is gradually decreased from 1, i.e., if the coupling state is gradually shifted from tight coupling toward loose coupling, such a change arises in Characteristic curve 1 in FIG. 5 that the bimodal tendency gradually fades and a curve near the center resonant frequency fo becomes flat. When the coupling coefficient k is decreased to a certain value, the coupling state reaches a so-called critical coupling state. In the critical coupling state, as shown by Characteristic curve 2, the bimodal characteristic tendency has disappeared and the shape of a curve around the center resonant frequency fo is flat.

If the coupling coefficient k is further decreased from the critical coupling state, and thus the degree of loose coupling is further increased, a unimodal characteristic is obtained as shown by Characteristic curve 3 of FIG. 5, in which one peak exists only at the center frequency fo. A comparison of Characteristic curve 3 with Characteristic curves 1 and 2 makes it apparent that Characteristic curve 3 has a steeper slope than that of Characteristic curves 1 and 2 as its quadratic curve shape, although the peak level itself of Characteristic curve 3 is lower than that of Characteristic curves 1 and 2.

The isolation converter transformer PIT of the present embodiment employs a loose coupling state in which the coupling coefficient k is smaller than about 0.7. Such a coupling coefficient k provides operation that is based on a unimodal characteristic shown by Characteristic curve 3.

Figure 12:
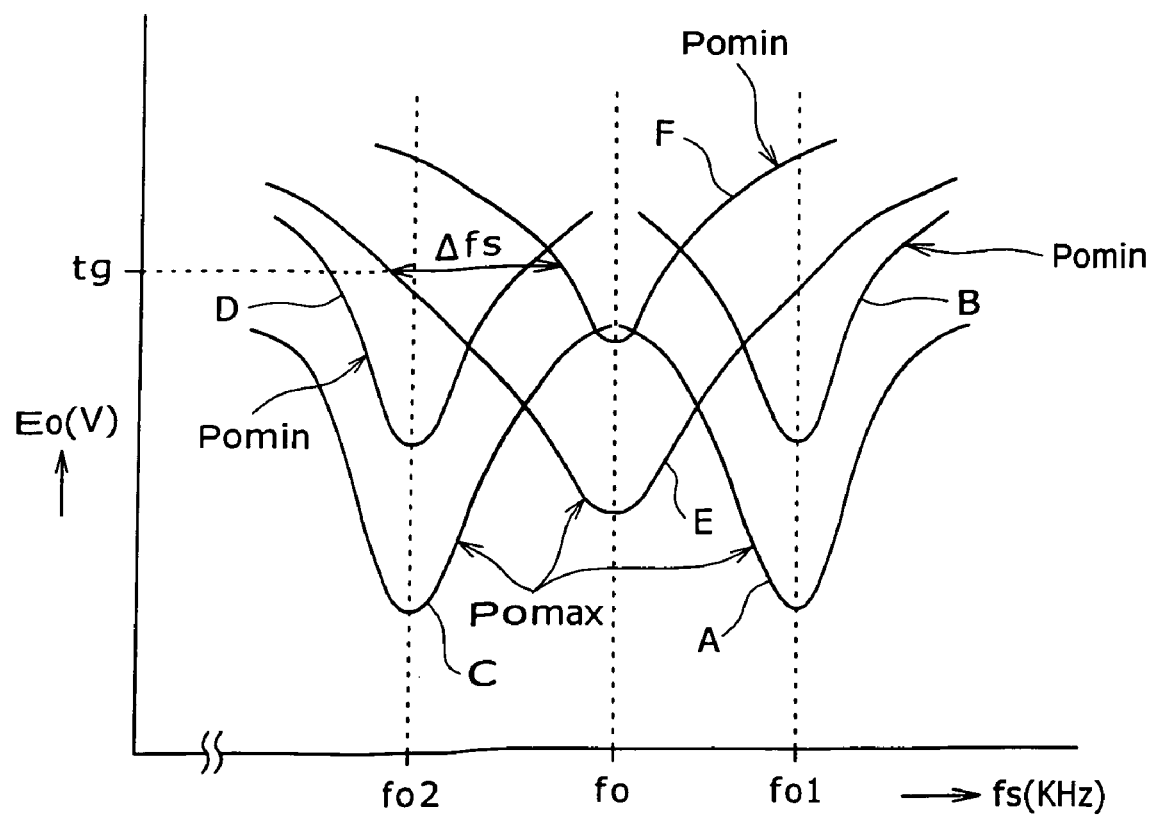
FIG. 12 is a diagram conceptually showing the constant-voltage control characteristic of a conventional power supply circuit.

When the unimodal characteristic shown in FIG. 5 is compared with the constant-voltage control characteristic in FIG. 12 of a conventional power supply circuit (FIG. 9), it is apparent that the characteristic in FIG. 12 shows a considerably gentler slope as a quadratic curve than that of FIG. 5.

Since the characteristic in FIG. 12 shows a gentle curve, even when a power supply circuit has a single-range compatible configuration for an AC input voltage VAC of 100 V for example, the requisite control range of the switching frequency fs for constant-voltage control of the secondary-side DC output voltage Eo is from 117.6 kHz to 208.3 kHz, and therefore Δfs is 96.7 kHz. Accordingly, as described above, it is very difficult to provide a power supply circuit with a wide-range compatible characteristic allowed simply by implementing constant-voltage control by switching frequency control.

Figure 6:
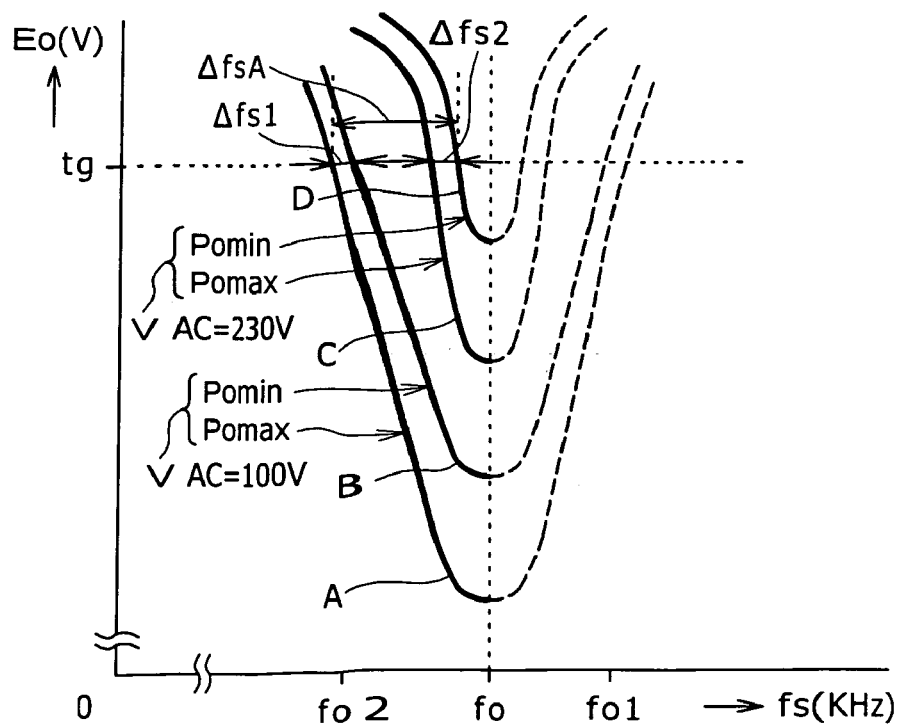
FIG. 6 is a diagram illustrating, as the constant-voltage control operation of a power supply circuit of one embodiment of the invention, the switching frequency control range (requisite control range) for addressing AC input voltage variation and load variation.

In contrast, the constant-voltage control characteristic of the present embodiment is a unimodal characteristic shown by Characteristic curve 3 in FIG. 5, and therefore the constant-voltage control operation thereof is expressed by the characteristic curves of FIG. 6.

FIG. 6 illustrates four Characteristic curves A to D obtained from the power supply circuit in FIG. 1 according to the present embodiment. Characteristics curves A and B correspond to the maximum load power Pomax and the minimum load power Pomin, respectively, when the AC input voltage VAC is 100V (AC 100 V-system). Characteristics curves C and D correspond to the maximum load power Pomax and the minimum load power Pomin, respectively, when the AC input voltage VAC is 230V (AC 200 V-system).

As is apparent from FIG. 6, when the AC input voltage VAC is 100 V, which corresponds to an AC 100 V-system input, the variable control range (requisite control range) of the switching frequency required for keeping the secondary-side DC output voltage Eo constant at a requisite rated level tg, is expressed by Δfs1. Specifically, the requisite control range is equivalent to the frequency range from the switching frequency fs providing the level tg on Characteristic curve A to the switching frequency fs providing the level tg on Characteristic curve B.

In addition, when the AC input voltage VAC is 230 V, which corresponds to an AC 200 V-system input, the variable control range (requisite control range) of the switching frequency required for keeping the secondary-side DC output voltage Eo constant at the requisite rated level tg, is expressed by Δfs2. Specifically, the requisite control range is equivalent to the frequency range from the switching frequency fs providing the level tg on Characteristic curve C to the switching frequency fs providing the level tg on Characteristic curve D.

As described above, the unimodal characteristic as the characteristic of controlling the secondary-side DC output voltage Eo in the present embodiment draws a considerably steep quadratic curve compared with the control characteristic shown in FIG. 12.

Therefore, the requisite control ranges Δfs1 and Δfs2 obtained when the AC input voltage VAC is 100 V and 230 V, respectively, are considerably smaller than the range Δfs in FIG. 12.

In addition, the frequency variable range (ΔfsA) between the minimum switching frequency in the range Δfs1 (the switching frequency fs providing the level tg on Characteristic curve A) and the maximum switching frequency in the range Δfs2 (the switching frequency fs providing the level tg on Characteristic curve D), is also considerably small.

Actually measured values of the frequency ranges Δfs1, Δfs2 and ΔfsA about the power supply circuit in FIG. 1 were as follows: Δfs1=55.0 kHz (=135.0 kHz–80.0 kHz), Δfs2=45.8 kHz (=181.8 kHz–136.0 kHz), and ΔfsA=101.8 kHz (=181.8 kHz–80.0 kHz).

The frequency variable range ΔfsA sufficiently falls within the switching frequency variable range of present switching drive ICs (the oscillation and drive circuit 2). That is, the power supply circuit in FIG. 1 can vary and control its switching frequency within the frequency variable range ΔfsA actually.

Thus, the power supply circuit of the present embodiment in FIG. 1 can adequately stabilize the secondary-side DC output voltage Eo, which is the main DC voltage, both for a commercial AC voltage input of the AC 100 V-system and for one of the AC 200 V-system. That is, a wide-range compatible configuration is allowed simply by implementing switching frequency control.

Note that coupled resonant circuits employing electromagnetic coupling have been already known as a measure for, in communication techniques, widening the amplification bandwidth of an amplification circuit formed of a transistor. The measure is typified by intermediate frequency transformer amplifiers for example. In this technique field, however, a unimodal characteristic due to loose coupling is not used but a bimodal characteristic due to tight coupling or a flat characteristic due to critical coupling is used. In the present embodiment, regarding a technique of such a coupled resonant circuit employing electromagnetic coupling, a unimodal characteristic due to loose coupling, which has been not used in communication technique fields, is actively used in a field of a resonant switching converter. Thus, the switching frequency variable range (requisite control range) required for stabilizing the secondary-side DC output voltage Eo is narrowed as described above, which can form a wide-range compatible configuration allowed simply by constant-voltage control by switching frequency control.

As a configuration for achieving a wide-range compatible circuit as a switching power supply circuit including a resonant converter, besides the configuration of the present embodiment, a configuration has been known in which the configuration of a primary-side switching converter is switched between a half-bride configuration and a full-bridge configuration depending on which of an AC 100 V-system input and an AC 200 V-system input a commercial AC voltage input is. In addition, another configuration is also known in which the operation of a rectifier circuit for rectifying a commercial AC voltage is switched between full-wave rectification and voltage-doubling rectification depending on which of an AC 100 V-system input and an AC 200 V-system input a commercial AC voltage input is.

However, the switch over of a circuit configuration in response to a change between the AC 100 V-system and AC 200 V-system involves the following problem.

In order to switch the circuit configuration according to a commercial AC voltage level, for example, the threshold value (e.g. 150 V) of an input voltage is set in advance, and the circuit configuration is switched to a configuration for the AC 200 V-system when an input voltage is higher than the threshold value, and to one for the AC 100 V-system when it is lower than the threshold value. However, such simple switch possibly causes a problem. For example, when an AC 200 V-system input is used, in response even to temporary lowering of an AC input voltage level due to an instantaneous power failure or the like, switch to a configuration for the AC 100 V-system is possibly carried out. Specifically, in a configuration for switching rectifying operation for example, there is a possibility that, even when an AC 200 V-system input is used, a determination is made that an AC 100 V-system input is used and thus switch to a voltage-doubler rectifier circuit is carried out, which breaks switching elements and so on due to overvoltage.

Therefore, in practice, in order to prevent the occurrence of the above-described malfunction, a configuration is employed that detects not only a DC input voltage to a main switching converter but also a DC input voltage to a converter circuit on the standby power supply side.

However, in order to detect a DC input voltage to a converter circuit on the standby power supply side, for example, a comparator IC for comparing a reference voltage with an input voltage needs to be provided. Accordingly, the number of parts increases, which facilitates an increase of circuit fabrication costs and the size of a circuit board.

In addition, since a DC input voltage of a converter on the standby power supply side needs to be detected for preventing malfunction, practical use of a power supply circuit is limited to use for an electronic apparatus that has a standby power supply in addition to a main power supply. That is, the kind of electronic apparatuses for which a power supply circuit can be used is limited to one including a standby power supply, which problematically narrows the application range of a power supply circuit correspondingly.

Furthermore, in a configuration that implements switch over between half-bridge and full-bridge configurations, at least four switching elements need to be provided in order to allow the full-bridge configuration. If this switch over is unnecessary, it is enough for the circuit to include only a half-bridge configuration, which needs only two switching elements. In contrast, if the circuit employs this switch over, additional two switching elements are required.

In addition, a configuration that implements switch over of rectifying operation needs to include two smoothing capacitors Ci in order to ensure voltage-doubling rectifying operation. That is, compared with a configuration that implements only full-wave rectification, additional one smoothing capacitor Ci is required.

Also from a viewpoint of these additional parts necessities, a wide-range compatible configuration in association with the above-described circuit switch over causes an increase of circuit fabrication costs and the size of a power supply circuit board. In particular, since the smoothing capacitor Ci falls in the category of large-size parts among parts of a power supply circuit, the configuration implementing switch over of rectifying operation further facilitates an increase of board size.

A wide control range of switching frequency also causes another problem that the high-speed response characteristic of stabilizing the secondary-side DC output voltage Eo is lowered.

In particular, some recent electronic apparatuses involve a load condition referred to as so-called switching load, in which load power is instantaneously switched between the maximum load and no load in response to ON/OFF of each drive part for example. Therefore, a power supply circuit needs to implement constant-voltage control of the secondary-side DC output voltage Eo with responding to such rapid and large variation of load power.

However, when a power supply circuit involves a wide control range of the switching frequency as described above, it takes a long time period for the circuit to vary its switching frequency to the frequency required for ensuring constant-voltage control in response to a load that varies between the maximum and minimum values. That is, the responsivity of constant-voltage control is lowered.

In contrast, if a wide-range compatible configuration is allowed simply by implementing switching frequency control like the present embodiment, there is no need to employ such a configuration like the above-described ones as switch, regarding rectifier circuitry for producing a DC input voltage (Ei), rectifying operation or the type of the switching converter between half-bridge connection and full-bridge connection, according to the rated level of a commercial AC voltage.

If the configuration for switch over of circuitry is unnecessary, the number of e.g. the smoothing capacitors Ci can be only one, and the number of switching elements can be at least only two, requisite for ensuring half-bridge connection. Accordingly, reduction of circuit component parts and circuit scale, lowering of switching noises, and so on can be achieved.

Moreover, if the configuration for switch over of circuitry is unnecessary, the need to provide a special configuration for preventing malfunction associated with the switch over is also eliminated. This respect also suppresses an increase of component parts and costs. Furthermore, since an electronic apparatus does not need to have a standby power supply to prevent malfunction, the range of apparatuses allowing use of a power supply circuit therefore can be widened.

The number of minimum necessary parts that should be added to a conventional voltage resonant converter, which includes a parallel resonant circuit only on its primary side, in order to achieve the advantages of the present embodiment, is only a secondary-side parallel resonant capacitor. Therefore, a wide-range compatible configuration can be achieved with a much lower number of additional parts than that when a conventional configuration employing switch over of circuitry is used.

In addition, due to the narrowing of the requisite control range ($\Delta fs$) of the switching frequency fs for constant-voltage control even under the condition of commercial AC voltage inputs of both the AC 100 V-system and AC 200 V-system, the responsivity and control sensitivity of the constant-voltage control are greatly improved.

Some electronic apparatuses implement operation in which the load power Po is varied so that the load condition is switched at comparatively high-speed between the maximum load and no load. This is referred to as so-called switching load. Examples of the apparatuses that implement such operation associated with the switching load include printers, which are a peripheral device of personal computers, and plasma displays.

If the apparatus that involves operation associated with the switching load is provided with a power supply circuit having a comparatively wide requisite control range $\Delta fs$ like that shown in FIG. 9 for example, the switching frequency fs needs to be varied by a large variation amount in association with a sharp change of the load power also as described above. Accordingly, it is difficult to ensure a high responsivity of constant-voltage control.

In contrast, in the present embodiment, the requisite control range $\Delta fs$ is significantly narrowed for each of the single ranges of the AC 100 V-system and AC 200 V-system in particular. This control range reduction allows stabilization of the secondary-side DC output voltage Eo with high speed response to a sharp variation of the load power Po between the maximum load and no load. That is, the responsivity of the constant-voltage control against switching load is significantly enhanced.

As described above with reference to FIG. 4, the power conversion efficiency $\eta AC \rightarrow DC$ of the power supply circuit in FIG. 1 is 92.3% when the AC input voltage VAC is 100 V and the load power is the maximum load power Pomax of 300 W. In contrast, the power conversion efficiency $\eta AC \rightarrow DC$ of the conventional power supply circuit in FIG. 9 is about 92% when the AC input voltage VAC is 100 V and the load power is the maximum load power Pomax of 200 W. That is, the efficiency of the circuit in FIG. 1 under the above-described condition is almost equal to or larger than that of the circuit in FIG. 9 under this condition. The allowable maximum load power of the present embodiment is 300 W, while that of the power supply circuit in FIG. 9 is 200 W. Therefore, when the power supply circuit of the present embodiment and the circuit of FIG. 9 operate under the same load condition, the power supply circuit of the present embodiment offers a considerably higher power conversion efficiency than the circuit of FIG. 9. In other words, in the power supply circuit of the present embodiment, the increase of the allowable maximum load power from 200 W to 300 W is allowed since a favorable power conversion efficiency characteristic is achieved.

In the present embodiment, a primary basic factor in the improvement of the power conversion efficiency is that a series resonant circuit is formed on the secondary side.

The inventor of the present application has confirmed in advance, from experiments and so on, that a combination of a secondary-side series resonant circuit with a primary-side parallel resonant circuit, as a voltage resonant converter, is particularly advantageous for obtaining a high power conversion efficiency. For example, the existence of a secondary-side series resonant circuit allows supply of power as the secondary-side DC output voltage Eo including an energy increase due to the resonant operation of the secondary-side series resonant circuit. This energy increase allows a corresponding decrease of amount of power transmitted from the primary side to the secondary side. Thus, power loss on the primary side is reduced, which achieves a high power conversion efficiency.

In addition, the voltage resonant converter provided with a secondary-side series resonant circuit has a characteristic in that the power conversion efficiency tends to increase as the load becomes lighter from the maximum load power. The power supply circuit of the present embodiment shown in FIG. 1 has a similar characteristic as shown in FIG. 4 since it has a secondary-side series resonant circuit. In contrast, a configuration obtained by combining a secondary-side parallel resonant circuit with a voltage resonant converter, like the power supply circuit of FIG. 9 for example, has a tendency that the power conversion efficiency decreases as the load becomes lighter. Compared with such a characteristic, a voltage resonant converter having a secondary-side series resonant circuit exhibits a favorable characteristic as a power conversion efficiency characteristic against load variation.

In addition to the above-described respect, the improvement of power conversion efficiency in the present embodiment is attributed also to setting of each resonant frequency.

Specifically, in the present embodiment, the power conversion efficiency $\eta AC \rightarrow DC$ is invariably at least 90% when the load power Po is within the load variation range from 200 W to 25 W. This power conversion efficiency characteristic under such a load condition is eventually due to adjustment of the resonant frequencies fo1, fo2 and fo3. More specifically, experiments were implemented with the resonant frequencies fo1, fo2 and fo3 being set to various values. Thus, the above-described power conversion efficiency characteristic is eventually obtained by establishing the relationship in which fo1 nearly equals fo2 and is larger than fo3 by setting the resonant frequencies as follows: fo1=108.8 kHz, fo2=96.5 kHz, and fo3=58.9 kHz.

Furthermore, the improvement of the power conversion efficiency due to this setting of the resonant frequencies is indicated also by the waveform of the switching current IQ1 shown in FIG. 3A.

Specifically, as is apparent from a comparison between the switching current IQ1 of FIG. 3A corresponding to the embodiment and that of FIG. 10A corresponding to a conventional circuit, in the waveform of the switching current IQ1 of FIG. 3A corresponding to the present embodiment, the peak level is obtained at timing before the turn off timing of the switching element Q1, at which the period TON ends and the period TOFF starts. At the turn off timing, the switching current IQ1 has a level lower than this peak level.

This waveform of the switching current IQ1 is associated with the waveform of the secondary winding current I2. Specifically, the secondary winding current I2 has a waveform component corresponding to the current that flows through a secondary-side resonant circuit including a combination between a parallel resonant circuit and a series resonant circuit. The waveform of the secondary winding current I2 is determined by setting of the resonant frequencies fo2 and fo3 relative to the resonant frequency fo1.

Thus, the waveform of the switching current IQ1 shown in FIG. 3A results from appropriate setting of the resonant frequencies fo1, fo2 and fo3 of the primary-side parallel resonant circuit, secondary-side parallel resonant circuit and secondary-side series resonant circuit, respectively.

The waveform of the switching current IQ1 of FIG. 3A indicates that the level of the switching current IQ1 at the time of turn off the switching element Q1 is suppressed. If the level of the switching current IQ1 at the time of turn off is suppressed, the switching loss and conductive loss at the time of turn off is correspondingly reduced.

The peak levels of the switching current IQ1 of FIG. 3A and FIG. 10A are 5 Ap and 4 Ap, respectively. The level of FIG. 10A is smaller. This peak level difference, however, is due to the difference of the maximum load power condition between FIG. 3A and FIG. 10A: 300 W and 200 W, respectively. Under the same load condition, the present embodiment offers lower switching loss and conductive loss since it provides such operation that the switching current IQ1 comes to the peak before turn off of the switching element Q1.

This decrease of switching loss and conductive loss in the switching element is one of factors in the achievement of a high power conversion efficiency in the power supply circuit of the present embodiment.

As described above, the basic configuration of the power supply circuit of the present embodiment for obtaining a favorable power conversion efficiency is a voltage resonant converter having a series resonant circuit on the secondary side. However, in the configuration that merely includes the secondary-side series resonant circuit, malfunction arises when the load power is intermediate load power.

Specifically, in the configuration obtained by simply combining a secondary-side series resonant circuit with a voltage resonant converter (primary-side parallel resonant circuit), the switching current IQ1 has the waveform shown in FIG. 3A when the power load is the maximum load power for example. In the waveform, the switching current IQ1 is at 0 level until the end of the period TOFF, which is the turn on timing of the switching element Q1. When the period TON starts, initially a current of the negative polarity flows through the body diode DD, and then the polarity is inverted and the switching current IQ1 flows between the drain and source of the switching element Q1. That is, zero voltage switching (ZVS) is adequately implemented. However, in a load range of intermediate loads, such operation arises that the switching current IQ1 flows as a noise at timing before the end of the period TOFF, which is the turn on timing. This operation is abnormal operation in which ZVS is not implemented adequately.

In such abnormal operation, a corresponding peak current flows at the time of turn on of the switching element Q1, which causes an increase of a switching loss. In addition, the occurrence of such abnormal operation anyway yields an offset of the phase-gain characteristic of the constant-voltage control circuitry for example, which leads to switching operation in an abnormal oscillation state. Therefore, it is difficult to put into practical use a power supply circuit that has a configuration in which a secondary-side parallel resonant circuit is combined with a conventional voltage resonant converter.

Such abnormal operation in response to an intermediate load is attributed to the interaction between the primary-side parallel resonant circuit that forms the voltage resonant converter and the secondary-side series resonant circuit, due to the simultaneous operation thereof.

The present embodiment employs a wide gap G of the isolation converter transformer PIT in the structure shown in FIG. 2. Thus, the coupling coefficient k between the primary and secondary sides is set lower than that of a conventional circuit. Accordingly, the primary-side parallel resonant circuit and secondary-side series resonant circuit form an electromagnetically coupled resonant circuit that has a sharp unimodal characteristic. Thus, a wide-range compatible configuration is allowed.

From a viewpoint of the relationship between the primary-side parallel resonant circuit and secondary-side series resonant circuit, such setting of the coupling coefficient k as to increase the degree of loose coupling serves to attenuate the interaction between the primary-side parallel resonant circuit and secondary-side series resonant circuit. This attenuation of the interaction eliminates the occurrence of a noise current as the operation of the switching current IQ1 at the time of turn on the switching element Q1, which offers a waveform based on normal ZVS operation. Furthermore, in association with this, abnormal oscillation operation is also eliminated. That is, in the entire allowable load power region, stable switching operation in which ZVS operation is maintained is ensured.

Therefore, the present embodiment of FIG. 1 allows practical use of the configuration obtained by combining the secondary-side series resonant circuit with the primary-side parallel resonant circuit.

As described above, in the present embodiment, loose coupling above a certain extent is ensured in the isolation converter transformer PIT in order to achieve two objects: achievement of a wide-range compatible configuration allowed simply by switching frequency control, and securing of ZVS operation in the entire allowable load power range.

Avoided in conventional voltage resonant converters is the enhancement of degree of loose coupling to such an extent as to yield a coupling coefficient k like one of the isolation converter transformer PIT of the present embodiment. This is because such loose coupling causes lowering of the power conversion efficiency due to an increase of power transmission loss from the primary side to the secondary side. In the power supply circuit of the present embodiment, however, significantly favorable power conversion efficiency characteristics are achieved in almost the entire allowable load power region also as shown in FIG. 4. The reasons and grounds therefore are as described above. As to achievement of a wide-range compatible configuration, as described above, the coupling coefficient between the primary and secondary sides of an isolation converter transformer is designed to be lower than that of conventional power supply circuits, to thereby form an electromagnetically coupled resonant circuit that is formed of primary-side and secondary-side parallel resonant circuits and has a sharp unimodal output characteristic. Thus, a power supply circuit can achieve a wide-range compatible configuration. In addition, the provision of an active clamp circuit offers changes of duty ratio of the periods Ton and Toff within one switching period in association with enlargement of the conduction angle. These duty ratio changes lead to a small frequency range requisite for constant-voltage control against load variation, which permits the maximum load power to be 300 W.

Therefore, the maximum load power of a power supply circuit without an active clamp circuit is 200 W, which is the same value as that of the power supply circuit in FIG. 9.

Variations of a secondary-side rectifier circuit as other embodiments of the present invention will be described below with reference to FIGS. 7 and 8.

Figure 7:
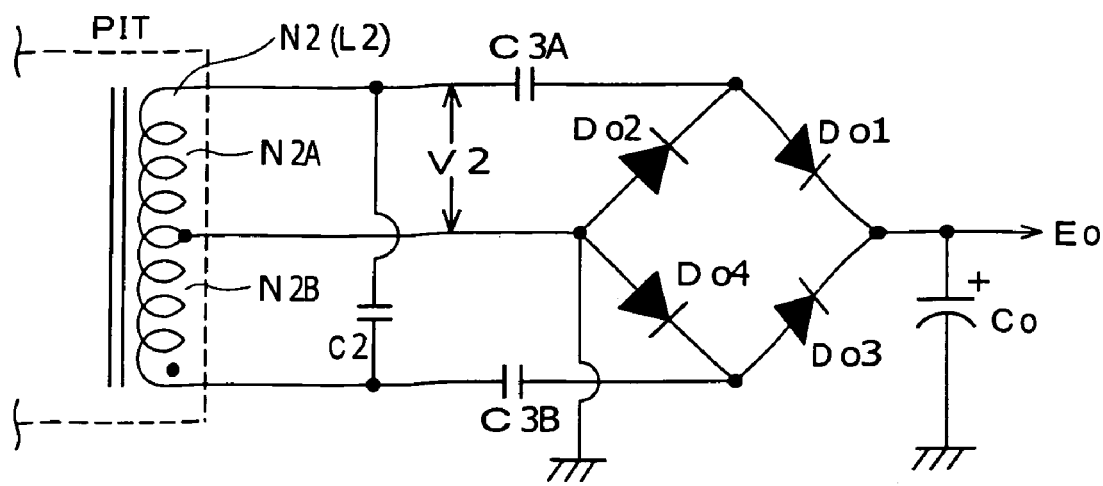
FIG. 7 is a circuit diagram illustrating a configuration example of a power supply circuit according to a second embodiment of the present invention.

FIG. 7 illustrates the configuration of a power supply circuit according to a second embodiment of the invention.

Note that FIG. 7 shows only the configuration of the secondary side from the isolation converter transformer PIT. Since parts other than these illustrated parts are the same as those of FIG. 1, the illustration thereof is omitted in FIG. 7. The same parts in FIG. 7 as those in FIG. 1 are given the same numerals and will not be described in detail below. This respect also applies to FIG. 8 similarly.

In the power supply circuit in FIG. 7, the secondary-side parallel resonant capacitor C2 is connected in parallel to the whole secondary winding N2. Thus, the leakage inductance L2 of the secondary winding N2 (N2A+N2B) and the capacitance of the secondary-side parallel resonant capacitor C2 form a secondary-side parallel resonant circuit. In addition, a secondary-side series resonant circuit is formed in the secondary-side rectifier circuit as described above.

The second embodiment includes a voltage-doubler full-wave rectifier circuit as the secondary-side rectifier circuit.

In the voltage-doubler full-wave rectifier circuit, the secondary winding N2 is provided with a center tap, and thus the secondary winding N2 is divided into secondary winding portions N2A and N2B on either side of the center tap. The secondary winding portions N2A and N2B have the same certain number of turns.

One end of the secondary winding N2 in the secondary winding portion N2A is connected in series to a secondary-side series resonant capacitor C3A. The other end of the secondary winding N2 in the secondary winding portion N2B is connected in series to a secondary-side series resonant capacitor C3B. Thus, a first secondary-side series resonant circuit is formed of the leakage inductance component of the secondary winding portion N2A and the capacitance of the secondary-side series resonant capacitor C3A, while a second secondary-side series resonant circuit is formed of the leakage inductance component of the secondary winding portion N2B and the capacitance of the secondary-side series resonant capacitor C3B.

The one end of the secondary winding N2 in the secondary winding portion N2A is coupled via the secondary-side series resonant capacitor C3A to the connecting node between the anode of the rectifier diode Do1 and the cathode of the rectifier diode Do2. The other end of the secondary winding N2 in the secondary winding portion N2B is coupled via the secondary-side series resonant capacitor C3B to the connecting node between the anode of the rectifier diode Do3 and the cathode of the rectifier diode Do4.

The cathodes of the rectifier diodes Do1 and Do3 are coupled to the positive electrode of the smoothing capacitor Co. The negative electrode of the smoothing capacitor Co is connected to the secondary-side ground.

The connecting node between the anodes of the rectifier diodes Do2 and Do4, and the center tap of the secondary winding N2 are also connected to the secondary-side ground.

This connecting structure forms first and second voltage-doubler half-wave rectifier circuits. The first rectifier circuit is formed of the secondary winding portion N2A, the secondary-side series resonant capacitor C3A, the rectifier diodes Do1 and Do2, and the smoothing capacitor Co. The second rectifier circuit is formed of the secondary winding portion N2B, the secondary-side series resonant capacitor C3B, the rectifier diodes Do3 and Do4, and the smoothing capacitor Co. In this case, the first voltage-doubler half-wave rectifier circuit includes the first secondary-side series resonant circuit, and the second voltage-doubler half-wave rectifier circuit includes the second secondary-side series resonant circuit.

In the first voltage-doubler half-wave rectifier circuit, in the periods of half cycles of one polarity of the alternating voltage induced in the secondary winding N2, rectifying operation is implemented in which the rectified current follows through the secondary winding portion N2A, the rectifier diode Do2, the secondary-side series resonant capacitor C3A, and the secondary winding portion N2A in that order. Thus, the secondary-side series resonant capacitor C3A is charged by the potential of the alternating voltage (V2) of the secondary winding portion N2A. In the periods of half cycles of the other polarity, rectifying operation is implemented in which the rectified current follows through the secondary winding portion N2A, the secondary-side series resonant capacitor C3A, the rectifier diode Do1, and the smoothing capacitor Co, and the secondary winding portion N2A in that order. Thus, the smoothing capacitor Co is charged by the potential resulting from superposition of the voltage across the secondary-side series resonant capacitor C3A and the alternating voltage of the secondary winding portion N2A. In addition, in response to the operation of the first voltage-doubler half-wave rectifier circuit, resonant operation of the first secondary-side series resonant circuit arises.

As for the second voltage-doubler half-wave rectifier circuit, in the periods of half cycles of the other polarity of the alternating voltage induced in the secondary winding N2, rectifying operation is implemented in which the rectified current follows through the secondary winding portion N2B, the rectifier diode Do4, the secondary-side series resonant capacitor C3B, and the secondary winding portion N2B in that order. Thus, the secondary-side series resonant capacitor C3B is charged by the potential of the alternating voltage (equivalent to the voltage V2) of the secondary winding portion N2B. In the periods of half cycles of the one polarity, rectifying operation is implemented in which the rectified current follows through the secondary winding portion N2B, the secondary-side series resonant capacitor C3B, the rectifier diode Do3, and the smoothing capacitor Co, and the secondary winding portion N2B in that order. Thus, the smoothing capacitor Co is charged by the potential resulting from superposition of the voltage across the secondary-side series resonant capacitor C3B and the alternating voltage of the secondary winding portion N2B. In response to the operation of the second voltage-doubler half-wave rectifier circuit, resonant operation of the second secondary-side series resonant circuit arises.

Furthermore, resonant operation of the secondary-side parallel resonant circuit arises in response to the operation of the first and second voltage-doubler half-wave rectifier circuits.

According to the above-described rectifying operation, in the periods of half cycles of one polarity of the alternating voltage of the secondary winding N2, the charging of the smoothing capacitor Co due to the rectified current is carried out with the potential resulting from superposition of the voltage induced in the secondary winding portion N2B and the voltage across the secondary-side series resonant capacitor C3B. In addition, in the periods of half cycles of the other polarity, the charging of the smoothing capacitor Co due to the rectified current is carried out with the potential resulting from superposition of the voltage induced in the secondary winding portion N2A and the voltage across the secondary-side series resonant capacitor C3A. Thus, the secondary-side DC output voltage Eo, which is the voltage across the smoothing capacitor Co, has the level equal to twice the level of the voltage (V2) induced in the secondary winding portions N2A and N2B. That is, operation of a voltage-doubler full-wave rectifier circuit is achieved.

Figure 8:
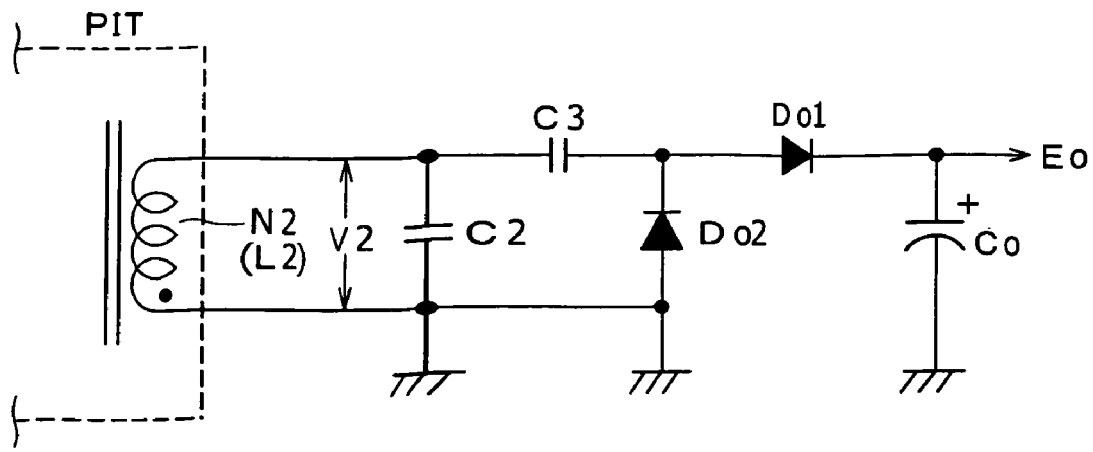
FIG. 8 is a circuit diagram illustrating a configuration example of a power supply circuit according to a third embodiment of the present invention.

FIG. 8 illustrates a configuration example of a power supply circuit according to a third embodiment of the invention.

In the power supply circuit of FIG. 8, one secondary-side parallel resonant capacitor C2 and one secondary-side series resonant capacitor C3 are coupled to the secondary winding N2 with the same connecting structure as that of FIG. 1. Thus, on the secondary side from the isolation converter transformer PIT, a secondary-side parallel resonant circuit is formed of the leakage inductance L2 of the secondary winding N2 and the capacitance of the secondary-side parallel resonant capacitor C2, and a secondary-side series resonant circuit is formed of the leakage inductance L2 of the secondary winding N2 and the capacitance of the secondary-side series resonant capacitor C3. In addition, a voltage-doubler half-wave rectifier circuit is provided as a secondary-side rectifier circuit.

This voltage-doubler half-wave rectifier circuit is formed by coupling two rectifier diodes Do1 and Do2 and one smoothing capacitor Co to the secondary winding N2, to which the secondary-side parallel and series resonant capacitors C2 and C3 are coupled as described above. The connecting structure of the voltage-doubler half-wave rectifier circuit is as follows. The winding-finish end of the secondary winding N2 is coupled via the secondary-side series resonant capacitor C3 to the anode of the rectifier diode Do1 and the cathode of the rectifier diode Do2. The cathode of the rectifier diode Do1 is connected to the positive electrode of the smoothing capacitor Co. Connected to the secondary-side ground are the winding-start end of the secondary winding N2, the anode of the rectifier diode Do2, and the negative electrode of the smoothing capacitor Co.

Rectifying operation of the thus formed voltage-doubler half-wave rectifier circuit is as follows.

In the periods of half cycles corresponding to one polarity of the secondary winding voltage V2, a forward voltage is applied to the rectifier diode Do2, which leads to conduction of the rectifier diode Do2. Therefore, the rectified current is charged in the secondary-side series resonant capacitor C3. Thus, generated across the secondary-side series resonant capacitor C3 is a voltage with the same level as that of the alternating voltage induced in the secondary winding N2. In the periods of half cycles of the other polarity of the secondary winding voltage V2, the rectifier diode Do1 is provided with a forward voltage and thus conducts. At this time, the smoothing capacitor Co is charged by the potential resulting from superposition of the secondary winding voltage V2 and the voltage across the secondary-side series resonant capacitor C3.

Thus, generated across the smoothing capacitor Co is the secondary-side DC output voltage Eo having the level equal to twice the level of the alternating voltage excited in the secondary winding N2. In this rectifying operation, the charging of the smoothing capacitor Co is implemented only in the periods of half cycles of one polarity of the alternating voltage excited in the secondary winding N2. That is, rectifying operation of a voltage-doubler half-wave rectifier circuit is achieved.

Moreover, in addition to the above-described rectifying operation, resonant operation of the secondary-side parallel and series resonant circuits arises.

It should be noted that the present invention is not limited to the above-described configurations as the embodiments. For example, other configurations are also available as the circuit configuration of details of the primary-side voltage resonant converter, and the configuration of the secondary-side rectifier circuit including a secondary-side parallel resonant circuit.

In addition, as the main switching element (and the auxiliary switching element), for example, an insulated gate bipolar transistor (IGBT) or a bipolar transistor may be used instead of a MOS-FET. Moreover, although the above-described embodiments employ a separately-excited switching converter, the present invention can also be applied to a configuration employing a self-excited switching converter.

The invention claimed is:

1. A switching power supply circuit, comprising:
   a switching unit including a main switching element supplied with a direct-current (DC) input voltage and operable to perform a switching operation;
   a switching drive unit that drives the main switching element to perform the switching operation;
   an isolation converter transformer having a primary winding on a primary side and a secondary winding on a secondary side, the primary winding being supplied with a switching output obtained by the switching operation of the switching unit, and the secondary winding having an alternating voltage induced therein by the primary winding;
   a primary-side parallel resonant circuit including a leakage inductance component of the primary winding and a capacitance of a primary-side parallel resonant capacitor, the primary-side parallel resonant circuit converting operation of the switching unit into a voltage resonant operation;
   a secondary-side parallel resonant circuit formed by a secondary-side parallel resonant capacitor connected in parallel with the secondary winding, the secondary-side parallel resonant circuit including a leakage inductance component of the secondary winding and a capacitance of the secondary-side parallel resonant capacitor;
   a secondary-side series resonant circuit formed by a secondary-side series resonant capacitor connected in series with the secondary winding, the secondary-side series resonant circuit including a leakage inductance component of the secondary winding and a capacitance of the secondary-side series resonant capacitor;
   a secondary-side rectifying and smoothing unit supplied with the alternating voltage induced in the secondary winding and performing a rectifying operation on the alternative voltage to produce a secondary-side DC output voltage;
   a constant-voltage control unit that performs constant-voltage control of the secondary-side DC output voltage by controlling the switching drive unit according to a level of the secondary-side DC output voltage to adjust the switching frequency of the switching unit, wherein
   the coupling coefficient between the primary side and the secondary side of the isolation converter transformer is set so as to obtain loose coupling therebetween so that an electromagnetically coupled resonant circuit formed by at least the primary-side parallel resonant circuit and the secondary-side parallel resonant circuit has a unimodal output characteristic with respect to the input of a frequency signal having the switching frequency; and
   a resonant frequency of the primary-side parallel resonant circuit, a resonant frequency of the secondary-side parallel resonant circuit and a resonant frequency of the secondary-side series resonant circuit are set so as to obtain a power conversion efficiency above a predetermined level under predetermined load conditions.

2. The switching power supply circuit according to claim 1, further comprising:
   an active clamp circuit including an auxiliary switching element, the active clamp circuit setting an ON period within a period during which the main switching element is in an off-state, the auxiliary switching element being in an on-state in the ON period, the active clamp circuit causing charging and discharging currents to flow through the auxiliary switching element during the ON period, the charging and discharging currents flowing to the primary-side parallel resonant capacitor in the absence of the active clamp circuit.

3. The switching power supply circuit according to claim 1, further comprising a tap dividing the secondary winding.

4. The switching power supply circuit according to claim 3, wherein each end of the divided secondary winding is connected in series to the secondary-side series resonant capacitor to thereby form the secondary-side series resonant circuit.

5. The switching power supply circuit according to claim 1, wherein the secondary-side rectifying and smoothing unit includes a bridge rectifier circuit to thereby perform a full-wave rectifying operation.

6. The switching power supply circuit according to claim 1, wherein the secondary-side rectifying and smoothing unit includes a voltage-doubler full-wave rectifier circuit for charging at least one of the secondary-side series resonant capacitor and a secondary-side smoothing capacitor in each half cycle of the alternating voltage induced in the secondary winding, and for producing the secondary-side DC output voltage having a level corresponding to twice the level of the alternating voltage.

7. The switching power supply circuit according to claim 1, wherein the secondary-side rectifying and smoothing unit includes a voltage-doubler half-wave rectifier circuit for charging the secondary-side series resonant capacitor or a secondary-side smoothing capacitor in each half cycle of the alternating voltage induced in the secondary winding, and for producing the secondary-side DC output voltage having a level corresponding to twice the level of the alternating voltage.

8. A switching power supply circuit, comprising:
a rectifying and smoothing unit supplied with an alternating-current input voltage and performing a rectifying and smoothing operation to output a direct-current (DC) voltage;
a switching unit including a main switching element supplied with the DC voltage output from the rectifying and smoothing unit, and operable to perform a switching operation;
a switching drive unit that drives the main switching element to perform the switching operation;
an isolation converter transformer having a primary winding on a primary side and a secondary winding on a secondary side, the primary winding being supplied with a switching output obtained by the switching operation of the switching unit, and the secondary winding having an alternating voltage induced therein by the primary winding;
a primary-side parallel resonant circuit including a leakage inductance component of the primary winding and a capacitance of a primary-side parallel resonant capacitor, the primary-side parallel resonant circuit converting operation of the switching unit into a voltage resonant operation;
a secondary-side parallel resonant circuit formed by a secondary-side parallel resonant capacitor connected in parallel with the secondary winding, the secondary-side parallel resonant circuit including a leakage inductance component of the secondary winding and a capacitance of the secondary-side parallel resonant capacitor;
a secondary-side series resonant circuit formed by a secondary-side series resonant capacitor connected in series with the secondary winding, the secondary-side series resonant circuit including a leakage inductance component of the secondary winding and a capacitance of the secondary-side series resonant capacitor;
a secondary-side rectifying and smoothing unit supplied with the alternating voltage induced in the secondary winding and performing a rectifying operation on the alternative voltage to produce a secondary-side DC output voltage; and
a constant-voltage control unit that performs constant-voltage control of the secondary-side DC output voltage by controlling the switching drive unit according to a level of the secondary-side DC output voltage to adjust the switching frequency of the switching unit, wherein
the coupling coefficient between the primary side and the secondary side of the isolation converter transformer is set so as to obtain loose coupling therebetween so that an electromagnetically coupled resonant circuit formed by at least the primary-side parallel resonant circuit and the secondary-side parallel resonant circuit has a unimodal output characteristic with respect to the input of a frequency signal having the switching frequency; and
a resonant frequency of the primary-side parallel resonant circuit, a resonant frequency of the secondary-side parallel resonant circuit and a resonant frequency of the secondary-side series resonant circuit are set so as to obtain a power conversion efficiency above a predetermined level under predetermined load conditions.

9. The switching power supply circuit according to claim 8, further comprising:
an active clamp circuit including an auxiliary switching element, the active clamp circuit setting an ON period within a period during which the main switching element is in an off-state, the auxiliary switching element being in an on-state in the ON period, the active clamp circuit causing charging and discharging currents to flow through the auxiliary switching element during the ON period, the charging and discharging currents flowing to the primary-side parallel resonant capacitor in the absence of the active clamp circuit.

10. The switching power supply circuit according to claim 8, further comprising a tap dividing the secondary winding.

11. The switching power supply circuit according to claim 10, wherein each end of the divided secondary winding is connected in series to the secondary-side series resonant capacitor to thereby form the secondary-side series resonant circuit.

12. The switching power supply circuit according to claim 8, wherein the secondary-side rectifying and smoothing unit includes a bridge rectifier circuit to thereby perform a full-wave rectifying operation.

13. The switching power supply circuit according to claim 8, wherein the secondary-side rectifying and smoothing unit includes a voltage-doubler full-wave rectifier circuit for charging at least one of the secondary-side series resonant capacitor and a secondary-side smoothing capacitor in each half cycle of the alternating voltage induced in the secondary winding, and for producing the secondary-side DC output voltage having a level corresponding to twice the level of the alternating voltage.

14. The switching power supply circuit according to claim 8, wherein the secondary-side rectifying and smoothing unit includes a voltage-doubler half-wave rectifier circuit for charging the secondary-side series resonant capacitor or a secondary-side smoothing capacitor in each half cycle of the alternating voltage induced in the secondary winding, and for producing the secondary-side DC output voltage having a level corresponding to twice the level of the alternating voltage.

* * * * *